United States Patent
Liu et al.

(10) Patent No.: US 9,645,357 B2
(45) Date of Patent: May 9, 2017

(54) OPTICAL IMAGE CAPTURING SYSTEM

(71) Applicant: ABILITY OPTO-ELECTRONICS TECHNOLOGY CO. LTD., Taichung (TW)

(72) Inventors: Yao-Wei Liu, Taichung (TW); Nai-Yuan Tang, Taichung (TW); Yeong-Ming Chang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

(21) Appl. No.: 14/856,009

(22) Filed: Sep. 16, 2015

(65) Prior Publication Data

US 2016/0341930 A1    Nov. 24, 2016

(30) Foreign Application Priority Data

May 21, 2015 (TW) .............................. 104116331 A

(51) Int. Cl.
| | | |
|---|---|---|
| *G02B 13/18* | (2006.01) | |
| *G02B 3/02* | (2006.01) | |
| *G02B 9/62* | (2006.01) | |
| *G02B 13/00* | (2006.01) | |

(52) U.S. Cl.
CPC ........... *G02B 13/0045* (2013.01); *G02B 9/62* (2013.01)

(58) Field of Classification Search
CPC .... G02B 13/002; G02B 13/0045; G02B 3/02; G02B 9/62
USPC ......................... 359/708, 713, 752, 756, 757
See application file for complete search history.

(56) References Cited

U.S. PATENT DOCUMENTS

| | | | |
|---|---|---|---|
| 2013/0070346 A1* | 3/2013 | Hsu ..................... | G02B 13/0045 359/713 |
| 2015/0029599 A1* | 1/2015 | Huang ..................... | G02B 3/04 359/713 |

* cited by examiner

*Primary Examiner* — William Choi
(74) *Attorney, Agent, or Firm* — Muncy, Geissler, Olds & Lowe, P.C.

(57) ABSTRACT

A six-piece optical lens for capturing image and a six-piece optical module for capturing image are provided. In order from an object side to an image side, the optical lens along the optical axis includes a first lens with refractive power, a second lens with refractive power, a third lens with refractive power, a fourth lens with refractive power, a fifth lens with refractive power and a sixth lens with refractive power. At least one of the image-side surface and object-side surface of each of the six lens elements is aspheric. The optical lens can increase aperture value and improve the imagining quality for use in compact cameras.

25 Claims, 18 Drawing Sheets

OPTICAL IMAGE CAPTURING SYSTEM

CROSS-REFERENCE TO RELATED APPLICATION

This application claims the benefit of Taiwan Patent Application No. 104116331, filed on May 21, 2015, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a four-lens or a five-lens design. However, the requirement for the higher pixels and the requirement for a large aperture of an end user, like functionalities of micro filming and night view, or the requirement of wide view angle of the portable electronic device have been raised. But the optical image capturing system with the large aperture design often produces more aberration resulting in the deterioration of quality in peripherical image formation and difficulties of manufacturing, and the optical image capturing system with wide view angle design increases distortion rate in image formation, thus the optical image capturing system in prior arts cannot meet the requirement of the higher order camera lens module.

Therefore, how to effectively increase quantity of incoming light and view angle of the optical lenses, not only further improves total pixels and imaging quality for the image formation, but also considers the equity design of the miniaturized optical lenses, becomes a quite important issue.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure denotes the geometrical shape of an image-side surface or an object-side surface of each lens on an optical axis) to increase the quantity of incoming light of the optical image capturing system and the view angle of the optical lenses, and to improve total pixels and imaging quality for image formation, so as to be applied to minimized electronic products.

The term and its definition to the lens element parameter in the embodiment of the present invention are shown as below for further reference.

The Lens Element Parameter Related to a Length or a Height in the Lens Element

A height for image formation of the optical image capturing system is denoted by HOI. A height of the optical image capturing system is denoted by HOS. A distance from the object-side surface of the first lens element to the image-side surface of the sixth lens element is denoted by InTL. A distance from an aperture stop (aperture) to an image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. A maximum effective half diameter (EHD) of any surface of a single lens element refers to a perpendicular height between an intersection point on the surface of the lens element where the incident light with the maximum view angle in the optical system passes through the outmost edge of the entrance pupil and the optical axis. For example, the maximum effective half diameter of the object-side surface of the first lens element is denoted by EHD 11. The maximum effective half diameter of the image-side surface of the first lens element is denoted by EHD 12. The maximum effective half diameter of the object-side surface of the second lens element is denoted by EHD 21. The maximum effective half diameter of the image-side surface of the second lens element is denoted by EHD 22. The maximum effective half diameters of any surfaces of other lens elements in the optical image capturing system are denoted in the similar way.

The Lens Element Parameter Related to a Depth of the Lens Element Shape

A distance in parallel with an optical axis from a maximum effective diameter position to an axial point on the object-side surface of the sixth lens element is denoted by InRS61 (instance). A distance in parallel with an optical axis from a maximum effective diameter position to an axial point on the image-side surface of the sixth lens element is denoted by InRS62 (instance).

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C51 on the object-side surface of the fifth lens element and the optical axis is HVT51 (instance). A distance perpendicular to the optical axis between a critical point C52 on the image-side surface of the fifth lens element and the optical axis is HVT52 (instance). A distance perpendicular to the optical axis between a critical point C61 on the object-side surface of the sixth lens element and the optical axis is HVT61 (instance). A distance perpendicular to the optical axis between a critical point C62 on the image-side surface of the sixth lens element and the optical axis is HVT62 (instance). Distances perpendicular to the optical axis between critical points on the object-side surfaces or the image-side surfaces of other lens elements and the optical axis are denoted in the similar way described above.

The object-side surface of the sixth lens element has one inflection point IF611 which is nearest to the optical axis, and the sinkage value of the inflection point IF611 is denoted by SGI611 (instance). SGI611 is a horizontal shift distance in parallel with the optical axis from an axial point on the object-side surface of the sixth lens element to the inflection point which is nearest to the optical axis on the object-side surface of the sixth lens element. A distance perpendicular to the optical axis between the inflection point IF611 and the optical axis is HIF611 (instance). The image-side surface of the sixth lens element has one inflection point IF621 which is nearest to the optical axis and the sinkage value of the inflection point IF621 is denoted by SGI621 (instance). SGI621 is a horizontal shift distance in parallel with the optical axis from an axial point on the image-side surface of the sixth lens element to the inflection point which is nearest to the optical axis on the image-side surface of the sixth lens element. A distance perpendicular to the optical axis between the inflection point IF621 and the optical axis is HIF621 (instance).

The object-side surface of the sixth lens element has one inflection point IF612 which is the second nearest to the optical axis and the sinkage value of the inflection point IF612 is denoted by SGI612 (instance). SGI612 is a horizontal shift distance in parallel with the optical axis from an axial point on the object-side surface of the sixth lens element to the inflection point which is the second nearest to the optical axis on the object-side surface of the sixth lens element. A distance perpendicular to the optical axis between the inflection point IF612 and the optical axis is HIF612 (instance). The image-side surface of the sixth lens element has one inflection point IF622 which is the second nearest to the optical axis and the sinkage value of the inflection point IF622 is denoted by SGI622 (instance). SGI622 is a horizontal shift distance in parallel with the optical axis from an axial point on the image-side surface of the sixth lens element to the inflection point which is the second nearest to the optical axis on the image-side surface of the sixth lens element. A distance perpendicular to the optical axis between the inflection point IF622 and the optical axis is HIF622 (instance).

The object-side surface of the sixth lens element has one inflection point IF613 which is the third nearest to the optical axis and the sinkage value of the inflection point IF613 is denoted by SGI613 (instance). SGI613 is a horizontal shift distance in parallel with the optical axis from an axial point on the object-side surface of the sixth lens element to the inflection point which is the third nearest to the optical axis on the object-side surface of the sixth lens element. A distance perpendicular to the optical axis between the inflection point IF613 and the optical axis is HIF613 (instance). The image-side surface of the sixth lens element has one inflection point IF623 which is the third nearest to the optical axis and the sinkage value of the inflection point IF623 is denoted by SGI623 (instance). SGI623 is a horizontal shift distance in parallel with the optical axis from an axial point on the image-side surface of the sixth lens element to the inflection point which is the third nearest to the optical axis on the image-side surface of the sixth lens element. A distance perpendicular to the optical axis between the inflection point IF623 and the optical axis is HIF623 (instance).

The object-side surface of the sixth lens element has one inflection point IF614 which is the fourth nearest to the optical axis and the sinkage value of the inflection point IF614 is denoted by SGI614 (instance). SGI614 is a horizontal shift distance in parallel with the optical axis from an axial point on the object-side surface of the sixth lens element to the inflection point which is the fourth nearest to the optical axis on the object-side surface of the sixth lens element. A distance perpendicular to the optical axis between the inflection point IF614 and the optical axis is HIF614 (instance). The image-side surface of the sixth lens element has one inflection point IF624 which is the fourth nearest to the optical axis and the sinkage value of the inflection point IF624 is denoted by SGI624 (instance). SGI624 is a horizontal shift distance in parallel with the optical axis from an axial point on the image-side surface of the sixth lens element to the inflection point which is the fourth nearest to the optical axis on the image-side surface of the sixth lens element. A distance perpendicular to the optical axis between the inflection point IF624 and the optical axis is HIF624 (instance).

The inflection points on the object-side surfaces or the image-side surfaces of the other lens elements and the distances perpendicular to the optical axis thereof or the sinkage values thereof are denoted in the similar way described above.

The Lens Element Parameter Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%-100%. An offset of the spherical aberration is denoted by DFS. An offset of the coma aberration is denoted by DFC.

A characteristic diagram of modulation transfer function (MTF) in the optical image capturing system is used to test and evaluate a contrast ratio and a sharpness of image capturing in the system. The vertical coordinate axis of the characteristic diagram of modulation transfer function represents a contrast transfer rate (values are from 0 to 1). The horizontal coordinate axis represents a spatial frequency (cycles/mm; lp/mm; line pairs per mm). Theoretically, an ideal image capturing system can 100% show the line contrast of a photographed object. However, the values of the contrast transfer rate at the vertical coordinate axis are smaller than 1 in the actual image capturing system, the transfer rate of its comparison value is less than a vertical axis. In addition, comparing to the central region, it is generally more difficult to achieve a fine degree of recovery in the edge region of image capturing. The contrast transfer rates (MTF values) with half spatial frequencies (half frequencies) at the optical axis, 0.3 field of view and 0.7 field of view on the image plane are respectively denoted by MTFH0, MTFH3 and MTFH7. The contrast transfer rates (MTF values) with full spatial frequencies at the optical axis, 0.3 field of view and 0.7 field of view on the image plane are respectively denoted by MTF0, MTF3 and MTF7. The three fields of view described above are representative to the centre, the internal field of view and the external field of view of the lens elements. Thus, they may be used to evaluate whether the performance of a specific optical image capturing system is excellent. The design of the optical image capturing system of the present invention mainly corresponds to a pixel size in which a sensing device below 1.12 micrometers is includes. Therefore, the half spatial frequencies (half frequencies) and the full spatial frequencies (full frequencies) of the characteristic diagram of modulation transfer function respectively are at least 220 cycles/mm and 440 cycles/mm.

The disclosure provides an optical image capturing system, an object-side surface or an image-side surface of the sixth lens element has inflection points, such that the angle of incidence from each field of view to the sixth lens element can be adjusted effectively and the optical distortion and the TV distortion can be corrected as well. Besides, the surfaces of the sixth lens element may have a better optical path adjusting ability to acquire better imaging quality.

The disclosure provides an optical image capturing system, in order from an object side to an image side, including a first, second, third, fourth, fifth, sixth lens elements and an image plane. The first lens element has refractive power. An object-side surface and an image-side surface of the sixth lens element are aspheric. Focal lengths of the first through sixth lens elements are f1, f2, f3, f4, f5 and f6 respectively. A focal length of the optical image capturing system is f. An entrance pupil diameter of the optical image capturing system is HEP. A distance from an object-side surface of the first lens element to the image plane is HOS. Thicknesses in parallel with an optical axis of the first through sixth lens elements at height ½ HEP respectively are ETP1, ETP2, ETP3, ETP4, ETP5 and ETP6. A sum of ETP1 to ETP6 described above is SETP. Thicknesses of the first through sixth lens elements on the optical axis respectively are TP1, TP2, TP3, TP4, TP5 and TP6. A sum of TP1 to TP6 described above is STP. The following relations are satisfied: $1.2 \leq f/HEP \leq 6.0$, $0.5 \leq HOS/f \leq 3$ and $0.5 \leq SETP/STP<1$.

The disclosure provides another optical image capturing system, in order from an object side to an image side, including a first, second, third, fourth, fifth, sixth lens elements and an image plane. The first lens element has positive refractive power, and the position near the optical axis on an object-side surface of the first lens element may be a convex surface. The second lens element has refractive power. The third lens element has refractive power. The fourth lens element has refractive power. The fifth lens element has refractive power. The sixth lens element has negative refractive power, and an object-side surface and an image-side surface of the sixth lens element are aspheric. At least two lens elements among the first through sixth lens elements respectively have at least one inflection point on at least one surface thereof. At least one of the second through sixth lens elements has positive refractive power. Focal lengths of the first through sixth lens elements are f1, f2, f3, f4, f5 and f6 respectively. A focal length of the optical image capturing system is f. An entrance pupil diameter of the optical image capturing system is HEP. A distance from an object-side surface of the first lens element to the image plane is HOS. A horizontal distance in parallel with the optical axis from a coordinate point on the object-side surface of the first lens element at height ½ HEP to the image plane is ETL. A horizontal distance in parallel with the optical axis from a coordinate point on the object-side surface of the first lens element at height ½ HEP to a coordinate point on the image-side surface of the sixth lens element at height ½ HEP is EIN. The following relations are satisfied: $1.2 \leq f/HEP \leq 6.0$, $0.5 \leq HOS/f \leq 3.0$ and $0.2 \leq EIN/ETL<1$.

The disclosure provides another optical image capturing system, in order from an object side to an image side, including a first, second, third, fourth, fifth, sixth lens elements and an image plane. The sixth lens element has at least one inflection point on at least one surface among an object-side surface and an image-side surface, wherein the optical image capturing system consists of six lens elements with refractive power and at least two lens elements among the first through sixth lens elements respectively have at least one inflection point on at least one surface thereof. The first lens element has positive refractive power. The second lens element has refractive power. The third lens element has refractive power. The fourth lens element has refractive power. The fifth lens element has refractive power and an object-side surface and an image-side surface of the fifth lens element are aspheric. The sixth lens element has negative refractive power and an object-side surface and an image-side surface of the sixth lens element are aspheric. Focal lengths of the first through sixth lens elements are f1, f2, f3, f4, f5 and f6 respectively. A focal length of the optical image capturing system is f. An entrance pupil diameter of the optical image capturing system is HEP. A distance from an object-side surface of the first lens element to the image plane is HOS. A horizontal distance in parallel with the optical axis from a coordinate point on the object-side surface of the first lens element at height ½ HEP to the image plane is ETL. A horizontal distance in parallel with the optical axis from a coordinate point on the object-side surface of the first lens element at height ½ HEP to a coordinate point on the image-side surface of the sixth lens element at height ½ HEP is EIN. The following relations are satisfied: $1.2 \leq f/HEP \leq 3.0$, $0.5 \leq HOS/f \leq 3.0$ and $0.2 \leq EIN/ETL<1$.

A thickness of a single lens element at height of ½ entrance pupil diameter (HEP) particularly affects the corrected aberration of common area of each field of view of light and the capability of correcting optical path difference between each field of view of light in the scope of ½ entrance pupil diameter (HEP). The capability of aberration correction is enhanced if the thickness becomes greater, but the difficulty for manufacturing is also increased at the same time. Therefore, it is necessary to control the thickness of a single lens element at height of ½ entrance pupil diameter (HEP), in particular to control the ratio relation (ETP/TP) of the thickness (ETP) of the lens element at height of ½ entrance pupil diameter (HEP) to the thickness (TP) of the lens element to which the surface belongs on the optical axis. For example, the thickness of the first lens element at height of ½ entrance pupil diameter (HEP) is denoted by ETP1. The thickness of the second lens element at height of ½ entrance pupil diameter (HEP) is denoted by ETP2. The thicknesses of other lens elements are denoted in the similar way. A sum of ETP1 to ETP6 described above is SETP. The embodiments of the present invention may satisfy the following relation: $0.3 \leq SETP/EIN<1$.

In order to enhance the capability of aberration correction and reduce the difficulty for manufacturing at the same time, it is particularly necessary to control the ratio relation (ETP/TP) of the thickness (ETP) of the lens element at height of ½ entrance pupil diameter (HEP) to the thickness (TP) of the lens element on the optical axis lens. For example, the thickness of the first lens element at height of ½ entrance pupil diameter (HEP) is denoted by ETP1. The thickness of the first lens element on the optical axis is TP1. The ratio between both of them is ETP1/TP1. The thickness of the second lens element at height of ½ entrance pupil diameter (HEP) is denoted by ETP2. The thickness of the second lens element on the optical axis is TP2. The ratio between both of them is ETP2/TP2. The ratio relations of the thicknesses of other lens element in the optical image capturing system at height of ½ entrance pupil diameter (HEP) to the thicknesses (TP) of the lens elements on the optical axis lens are denoted in the similar way. The embodiments of the present invention may satisfy the following relation: 0.2≤ETP/TP≤3.

A horizontal distance between two adjacent lens elements at height of ½ entrance pupil diameter (HEP) is denoted by ED. The horizontal distance (ED) described above is in parallel with the optical axis of the optical image capturing system and particularly affects the corrected aberration of common area of each field of view of light and the capability of optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' to the length of the optical image capturing system is restricted. Thus, it is essential to control the horizontal distance (ED) between two specific adjacent lens elements at height of ½ entrance pupil diameter (HEP).

In order to enhance the capability of aberration correction and reduce the difficulty for 'miniaturization' to the length of the optical image capturing system at the same time, it is particularly necessary to control the ratio relation (ED/IN) of the horizontal distance (ED) between the two adjacent lens elements at height of ½ entrance pupil diameter (HEP) to the horizontal distance (IN) between the two adjacent lens elements on the optical axis. For example, the horizontal distance between the first lens element and the second lens element at height of ½ entrance pupil diameter (HEP) is denoted by ED12. The horizontal distance between the first lens element and the second lens element on the optical axis is IN12. The ratio between both of them is ED12/IN12. The horizontal distance between the second lens element and the third lens element at height of ½ entrance pupil diameter (HEP) is denoted by ED23. The horizontal distance between the second lens element and the third lens element on the optical axis is IN23. The ratio between both of them is ED23/IN23. The ratio relations of the horizontal distances between other two adjacent lens elements in the optical image capturing system at height of ½ entrance pupil diameter (HEP) to the horizontal distances between the two adjacent lens elements on the optical axis are denoted in the similar way.

A horizontal distance in parallel with the optical axis from a coordinate point on the image-side surface of the sixth lens element at height ½ HEP to the image plane is EBL. A horizontal distance in parallel with the optical axis from an axial point on the image-side surface of the sixth lens element to the image plane is BL. The embodiments of the present invention enhance the capability of aberration correction and reserve space for accommodating other optical elements. The following relation may be satisfied: 0.2≤EBL/BL<1. The optical image capturing system may further include a light filtration element. The light filtration element is located between the sixth lens element and the image plane. A distance in parallel with the optical axis from a coordinate point on the image-side surface of the sixth lens element at height ½ HEP to the light filtration element is EIR. A distance in parallel with the optical axis from an axial point on the image-side surface of the sixth lens element to the light filtration element is PIR. The embodiments of the present invention may satisfy the following relation: 0.2≤EIR/PIR≤0.8.

The height of optical system (HOS) may be reduced to achieve the minimization of the optical image capturing system when the absolute value of f1 is larger than f6 (|f1|>f6).

When |f2|+|f3|+|f4|+|f5| and |f1|+|f6| are satisfied with above relations, at least one of the second through fifth lens elements may have weak positive refractive power or weak negative refractive power. The weak refractive power indicates that an absolute value of the focal length of a specific lens element is greater than 10. When at least one of the second though fifth lens elements has the weak positive refractive power, the positive refractive power of the first lens element can be shared, such that the unnecessary aberration will not appear too early. On the contrary, when at least one of the second through fifth lens elements has the weak negative refractive power, the aberration of the optical image capturing system can be corrected and fine tuned.

The sixth lens element may have negative refractive power and a concave image-side surface. Hereby, the back focal length is reduced for keeping the miniaturization, to miniaturize the lens element effectively. In addition, at least one of the object-side surface and the image-side surface of the sixth lens element may have at least one inflection point, such that the angle of incident with incoming light from an off-axis field of view can be suppressed effectively and the aberration in the off-axis field of view can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
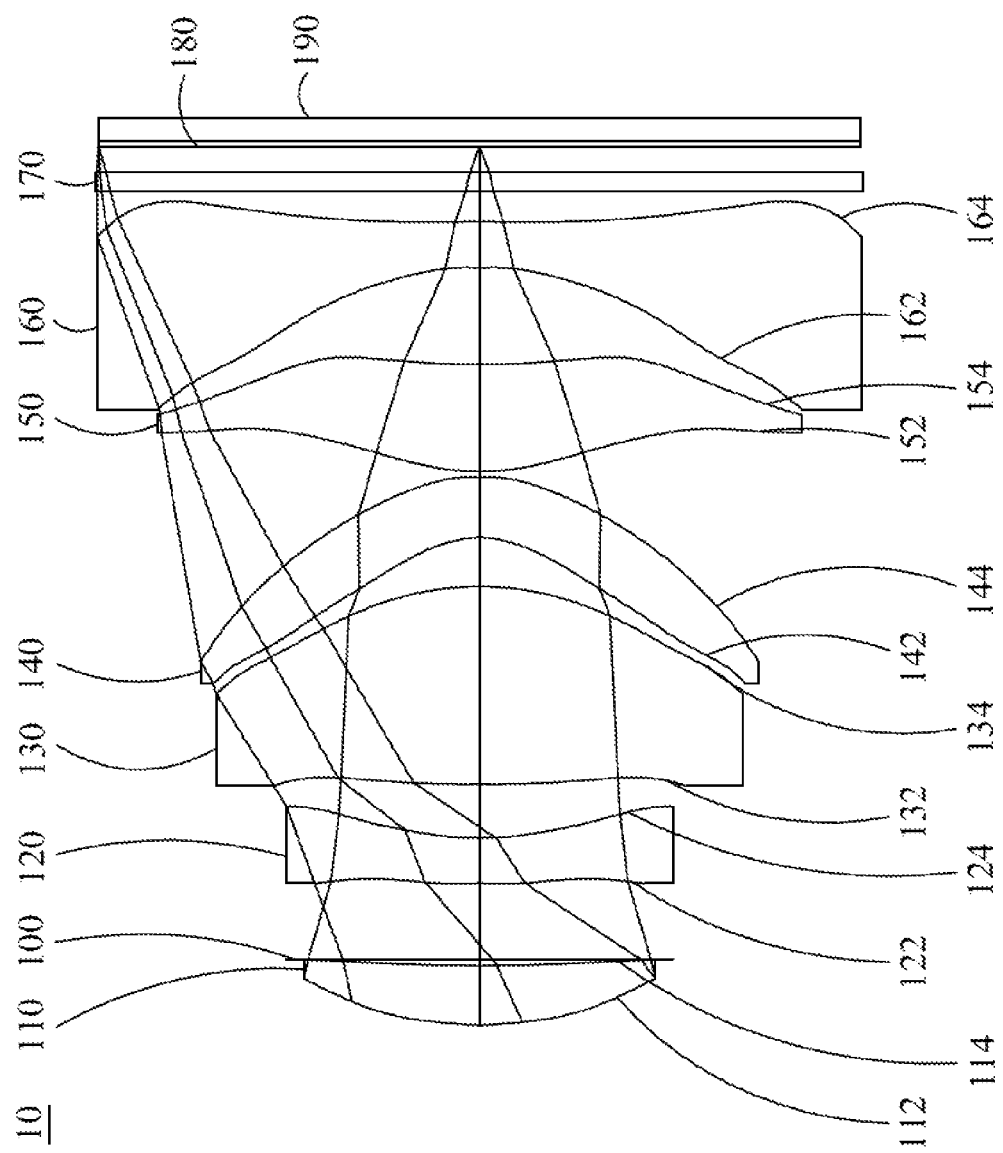
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first, second, third, fourth, fifth, sixth lens elements with refractive power and an image plane. The optical image capturing system may further include an image sensing device which is disposed on an image plane. The image heights in the following embodiments all tend to 3.91 mm.

The optical image capturing system may use three sets of wavelengths which are 486.1 nm, 555 nm and 656.2 nm, respectively, wherein 555 nm is served as the primary reference wavelength and is served as the primary reference wavelength of technical features. The optical image capturing system may also use five sets of wavelengths which are 470 nm, 510 nm, 555 nm, 610 nm and 650 nm, respectively, wherein 555 nm is served as the primary reference wavelength and is served as the primary reference wavelength of technical features.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: $0.5 \leq \Sigma PPR/|\Sigma NPR| \leq 3.5$. Preferably, the following relation may be satisfied: $1 \leq \Sigma PPR/|\Sigma NPR| \leq 3.0$.

The first lens element may have positive refractive power, and it has a convex object-side surface. Hereby, strength of the positive refractive power of the first lens element can be fined-tuned, so as to reduce the total length of the optical image capturing system.

The second lens element may have negative refractive power, and it has a convex object-side surface. Hereby, the aberration generated by the first lens element can be corrected.

The third lens element may have positive refractive power, and it has a convex image-side surface. Hereby, the positive refractive power of the first lens element can be shared to prevent the aberration from increasing excessively and reduce the sensitivity of the optical image capturing system.

The fourth lens element may have negative refractive power, and it has a convex object-side surface. Hereby, the aberration can be corrected such that the image plane becomes more even.

The fifth lens element may have positive refractive power, and at least one surface of the fifth lens element may have at least one inflection point. Hereby, the angle of incident of each view field on the fifth lens element can be effectively adjusted and the spherical aberration can thus be improved.

The sixth lens element may have negative refractive power and a concave image-side surface. Hereby, the back focal length is reduced to miniaturize the lens element effectively. In addition, at least one of the object-side surface and the image-side surface of the sixth lens element may have at least one inflection point, such that the angle of incident with incoming light from an off-axis view field can be suppressed effectively and the aberration in the off-axis view field can be corrected further.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following relations are satisfied: $HOS/HOI \leq 3$ and $0.5 \leq HOS/f \leq 2.5$. Preferably, the following relations may be satisfied: $1 \leq HOS/HOI \leq 2.5$ and $1 \leq HOS/f \leq 2$. Hereby, the miniaturization of the optical image capturing system can be maintained effectively, so as to be carried by lightweight portable electronic devices.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: $0.5 \leq InS/HOS \leq 1.1$. Hereby, features of maintaining the minimization for the optical image capturing system and having wide-angle are available simultaneously.

In the optical image capturing system of the disclosure, a distance from the object-side surface of the first lens element to the image-side surface of the sixth lens element is InTL. A sum of central thicknesses of all lens elements with refractive power on the optical axis is ETP. The following relation is satisfied: $0.1 \Sigma TP/InTL \leq 0.9$. Hereby, contrast ratio for the image formation in the optical image capturing system and defect-free rate for manufacturing the lens element can be given consideration simultaneously, and a proper back focal length is provided to dispose other optical components in the optical image capturing system.

A curvature radius of the object-side surface of the first lens element is R1. A curvature radius of the image-side surface of the first lens element is R2. The following relation is satisfied: $0.001 \leq |R1/R2| \leq 20$. Hereby, the first lens element may have proper strength of the positive refractive power, so as to avoid the longitudinal spherical aberration to increase too fast. Preferably, the following relation may be satisfied: $0.01 \leq |R1/R2| < 0.8$.

A curvature radius of the object-side surface of the sixth lens element is R11. A curvature radius of the image-side surface of the sixth lens element is R12. The following relation is satisfied: $-7 < (R11-R12)/(R1+R12) < 50$. Hereby, the astigmatism generated by the optical image capturing system can be corrected beneficially.

A distance between the first lens element and the second lens element on the optical axis is IN12. The following relation is satisfied: $IN12/f \leq 0.8$. Hereby, the chromatic aberration of the lens elements can be improved, such that the performance can be increased.

A distance between the fifth lens element and the sixth lens element on the optical axis is IN56. The following relation is satisfied: $IN56/f \leq 0.8$. Hereby, the chromatic aberration of the lens elements can be improved, such that the performance can be increased.

Central thicknesses of the first lens element and the second lens element on the optical axis are TP1 and TP2, respectively. The following relation is satisfied: $0.1 \leq (TP1+IN12)/TP2 \leq 10$. Hereby, the sensitivity produced by the optical image capturing system can be controlled, and the performance can be increased.

Central thicknesses of the fifth lens element and the sixth lens element on the optical axis are TP5 and TP6, respectively, and a distance between the aforementioned two lens elements on the optical axis is IN56. The following relation is satisfied: $0.1 \leq (TP6+IN56)/TP5 \leq 10$. Hereby, the sensitivity produced by the optical image capturing system can be controlled and the total height of the optical image capturing system can be reduced.

Central thicknesses of the second lens element, the third lens element and the fourth lens element on the optical axis are TP2, TP3 and TP4, respectively. A distance between the second lens element and the third lens element on the optical axis is IN23. A distance between the third lens element and the fourth lens element on the optical axis is IN34. A distance between the fourth lens element and the fifth lens element on the optical axis is IN45. A distance on the optical axis from the object-side surface of the first lens element to the image-side surface of the sixth lens element is InTL The following relation is satisfied: $0.1 \leq TP4/(IN34+TP4+IN45) <1$. Hereby, the aberration generated by the process of moving the incident light can be adjusted slightly layer upon layer, and the total height of the optical image capturing system can be reduced.

In the optical image capturing system of the disclosure, a distance perpendicular to the optical axis between a critical point C61 on the object-side surface of the sixth lens element and the optical axis is HVT61. A distance perpendicular to the optical axis between a critical point C62 on the image-side surface of the sixth lens element and the optical axis is HVT62. A horizontal displacement distance on the optical axis from an axial point on the object-side surface of the sixth lens element to the critical point C61 is SGC61. A horizontal displacement distance on the optical axis from an axial point on the image-side surface of the sixth lens element to the critical point C62 is SGC62. The following relations are satisfied: $0 \text{ mm} \leq HVT61 \leq 3 \text{ mm}$, $0 \text{ mm} < HVT62 \leq 6 \text{ mm}$, $0 \leq HVT61/HVT62$, $0 \text{ mm} \leq |SGC61| \leq 0.5 \text{ mm}$, $0 \text{ mm} < |SGC62| \leq 2 \text{ mm}$ and $0 < |SGC62|/(|SGC62|+TP6) \leq 0.9$. Hereby, the aberration in the off-axis view field can be corrected.

The optical image capturing system of the disclosure satisfies the following relation: $0.2 \leq HVT62/HOI \leq 0.9$. Preferably, the following relation may be satisfied: $0.3 \leq HVT62/HOI \leq 0.8$. Hereby, the aberration of surrounding view field can be corrected.

The optical image capturing system of the disclosure satisfies the following relation: $0 \leq HVT62/HOS \leq 0.5$. Preferably, the following relation may be satisfied: $0.2 \leq HVT62/HOS \leq 0.45$. Hereby, the aberration of surrounding view field can be corrected.

In the optical image capturing system of the disclosure, a distance in parallel with an optical axis from an inflection point on the object-side surface of the sixth lens element which is nearest to the optical axis to an axial point on the object-side surface of the sixth lens element is denoted by SGI611. A distance in parallel with an optical axis from an inflection point on the image-side surface of the sixth lens element which is nearest to the optical axis to an axial point on the image-side surface of the sixth lens element is denoted by SGI621. The following relations are satisfied: $0 < SGI611/(SGI611+TP6) \leq 0.9$ and $0 < SGI621/(SGI621+TP6) \leq 0.9$. Preferably, the following relations may be satisfied: $0.1 \leq SGI611/(SGI611+TP6) \leq 0.6$ and $0.1 \leq SGI621/(SGI621+TP6) \leq 0.6$.

A distance in parallel with the optical axis from the inflection point on the object-side surface of the sixth lens element which is the second nearest to the optical axis to an axial point on the object-side surface of the sixth lens element is denoted by SGI612. A distance in parallel with an optical axis from an inflection point on the image-side surface of the sixth lens element which is the second nearest to the optical axis to an axial point on the image-side surface of the sixth lens element is denoted by SGI622. The following relations are satisfied: 0<SGI612/(SGI612+TP6) ≤0.9 and 0<SGI622/(SGI622+TP6)≤0.9. Preferably, the following relations may be satisfied: 0.1≤SGI612/(SGI612+TP6)≤0.6 and 0.1≤SGI622/(SGI622+TP6)≤0.6.

A distance perpendicular to the optical axis between the inflection point on the object-side surface of the sixth lens element which is nearest to the optical axis and the optical axis is denoted by HIF611. A distance perpendicular to the optical axis between an inflection point on the image-side surface of the sixth lens element which is nearest to the optical axis and an axial point on the image-side surface of the sixth lens element is denoted by HIF621. The following relations are satisfied: 0.001 mm≤|HIF611|≤5 mm and 0.001 mm≤|HIF621|≤5 mm. Preferably, the following relations may be satisfied: 0.1 mm≤|HIF611|≤3.5 mm and 1.5 mm≤|HIF621|≤3.5 mm○.

A distance perpendicular to the optical axis between the inflection point on the object-side surface of the sixth lens element which is the second nearest to the optical axis and the optical axis is denoted by HIF612. A distance perpendicular to the optical axis between an axial point on the image-side surface of the sixth lens element and an inflection point on the image-side surface of the sixth lens element which is the second nearest to the optical axis is denoted by HIF622. The following relations are satisfied: 0.001 mm≤|HIF612|≤5 mm and 0.001 mm≤|HIF622|≤5 mm. Preferably, the following relations may be satisfied: 0.1 mm≤|HF622|≤3.5 mm and 0.1 mm≤|HIF612|≤3.5 mm.

A distance perpendicular to the optical axis between the inflection point on the object-side surface of the sixth lens element which is the third nearest to the optical axis and the optical axis is denoted by HIF613. A distance perpendicular to the optical axis between an axial point on the image-side surface of the sixth lens element and an inflection point on the image-side surface of the sixth lens element which is the third nearest to the optical axis is denoted by HIF623. The following relations are satisfied: 0.001 mm≤|HIF613|≤5 mm and 0.001 mm≤|HIF623|≤5 mm. Preferably, the following relations may be satisfied: 0.1 mm≤|HIF623|≤3.5 mm and 0.1 mm≤|HIF613|≤0.3.5 mm.

A distance perpendicular to the optical axis between the inflection point on the object-side surface of the sixth lens element which is the fourth nearest to the optical axis and the optical axis is denoted by HIF614. A distance perpendicular to the optical axis between an axial point on the image-side surface of the sixth lens element and an inflection point on the image-side surface of the sixth lens element which is the fourth nearest to the optical axis is denoted by HIF624. The following relations are satisfied: 0.001 mm≤|HIF614|≤5 mm and 0.001 mm≤|HIF624|≤5 mm. Preferably, the following relations may be satisfied: 0.1 mm≤|HIF624|≤3.5 mm and 0.1 mm≤|HIF614|≤3.5 mm.

In one embodiment of the optical image capturing system of the present disclosure, the chromatic aberration of the optical image capturing system can be corrected by alternatively arranging the lens elements with large Abbe number and small Abbe number.

The above Aspheric formula is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \quad (1).$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through sixth lens elements may be aspheric, so as to obtain more control variables. Comparing with the usage of traditional lens element made by glass, the number of lens elements used can be reduced and the aberration can be eliminated. Thus, the total height of the optical image capturing system can be reduced effectively.

In addition, in the optical image capturing system provided by the disclosure, if the lens element has a convex surface, the surface of the lens element adjacent to the optical axis is convex in principle. If the lens element has a concave surface, the surface of the lens element adjacent to the optical axis is concave in principle.

The optical image capturing system of the disclosure can be adapted to the optical image capturing system with automatic focus if required. With the features of a good aberration correction and a high quality of image formation, the optical image capturing system can be used in various application fields.

The optical image capturing system of the disclosure can include a driving module according to the actual requirements. The driving module may be coupled with the lens elements to enable the lens elements producing displacement. The driving module may be the voice coil motor (VCM) which is applied to move the lens to focus, or may be the optical image stabilization (OIS) which is applied to reduce the distortion frequency owing to the vibration of the lens while shooting.

According to the above embodiments, the specific embodiments with figures are presented in detail as below.

The First Embodiment (Embodiment 1)

Figure 1B:
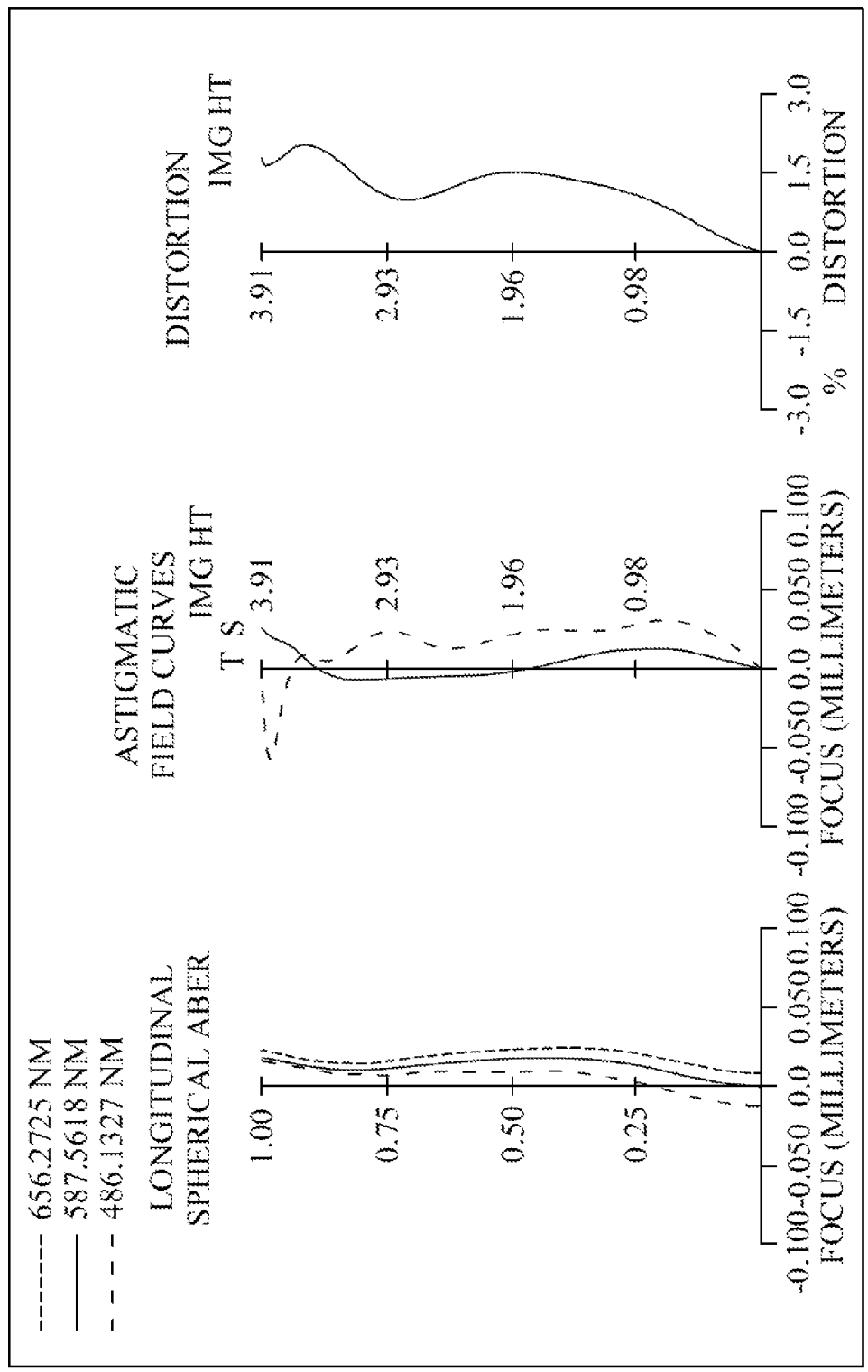
FIG. 1B is longitudinal spherical aberration curves, astigmatic field curves, and an optical distortion grid of the optical image capturing system in the order from left to right according to the first embodiment of the present application.
Figure 1C:
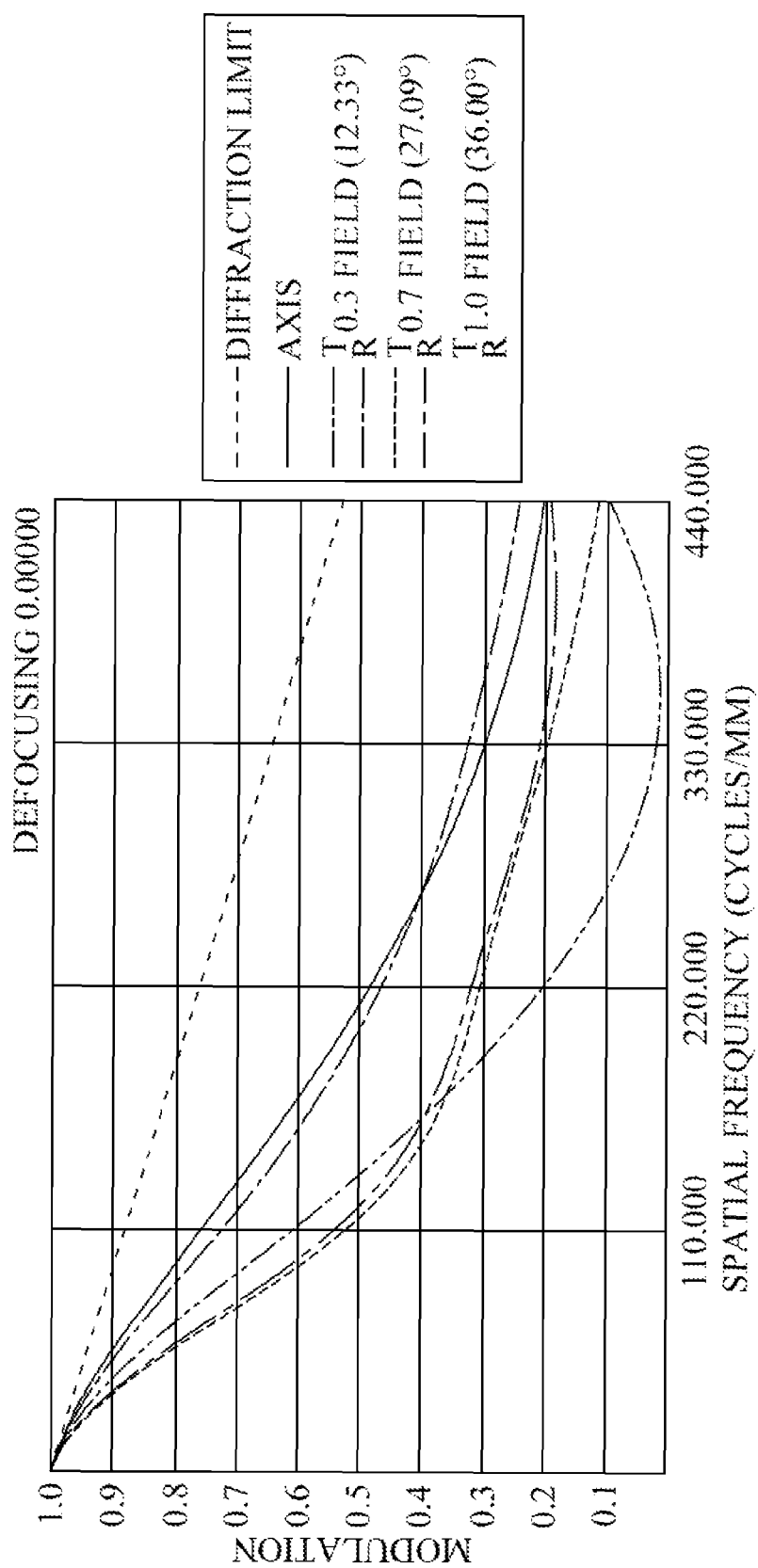
FIG. 1C is a characteristic diagram of modulation transfer according to the first embodiment of the present application.

Please refer to FIG. 1A and FIG. 1B. FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a characteristic diagram of modulation transfer according to the first embodiment of the present application. As shown in FIG. 1A, in order from an object side to an image side, the optical image capturing system includes a first lens element 110, an aperture stop 100, a second lens element 120, a third lens element 130, a fourth lens element 140, a fifth lens element 150, a sixth lens element 160, an IR-bandstop filter 180, an image plane 190, and an image sensing device 192.

The first lens element 110 has positive refractive power and it is made of plastic material. The first lens element 110 has a convex object-side surface 112 and a concave image-side surface 114, both of the object-side surface 112 and the image-side surface 114 are aspheric. The thickness of the first lens element on the optical axis is TP1. The thickness of the first lens element at height of ½ entrance pupil diameter (HEP) is denoted by ETP1.

The second lens element 120 has negative refractive power and it is made of plastic material. The second lens element 120 has a convex object-side surface 122 and a concave image-side surface 124, and both of the object-side surface 122 and the image-side surface 124 are aspheric. The image-side surface 124 has an inflection point. The thickness of the second lens element on the optical axis is TP2. The thickness of the second lens element at height of ½ entrance pupil diameter (HEP) is denoted by ETP2.

A distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221. The following relations are satisfied: SGI211=0.029207 mm, |SGI211|/(|SGI211|+TP2)= 0.06002, SGI221=0.18704 mm and |SGI221|/(|SGI221|+TP2)=0.29023.

A distance perpendicular to the optical axis from the inflection point on the object-side surface of the second lens element which is nearest to the optical axis to an axial point on the object-side surface of the second lens element is denoted by HIF211. A distance perpendicular to the optical axis from the inflection point on the image-side surface of the second lens element which is nearest to the optical axis to an axial point on the image-side surface of the second lens element is denoted by HIF221. The following relations are satisfied: HIF211=0.662001 mm, HIF211/HOI=0.16918, HIF221=1.18732 mm and HIF221/HOI=0.30343.

The third lens element 130 has positive refractive power and it is made of plastic material. The third lens element 130 has a convex object-side surface 132 and a convex image-side surface 134, and both of the object-side surface 132 and the image-side surface 134 are aspheric. The object-side surface 132 has an inflection point and the image-side surface 134 has two inflection points. The thickness of the third lens element on the optical axis is TP3. The thickness of the third lens element at height of ½ entrance pupil diameter (HEP) is denoted by ETP3.

A distance in parallel with an optical axis from an inflection point on the object-side surface of the third lens element which is nearest to the optical axis to an axial point on the object-side surface of the third lens element is denoted by SGI311. A distance in parallel with an optical axis from an inflection point on the image-side surface of the third lens element which is nearest to the optical axis to an axial point on the image-side surface of the third lens element is denoted by SGI321. The following relations are satisfied: SGI311=0.0407214 mm, |SGI311|/(|SGI311|+TP3)=0.01982, SGI321=−0.5937 mm and |SGI321|/(|SGI321|+TP3)=0.22769.

A distance in parallel with an optical axis from an inflection point on the object-side surface of the third lens element which is the second nearest to the optical axis to an axial point on the object-side surface of the third lens element is denoted by SGI312. A distance in parallel with an optical axis from an inflection point on the image-side surface of the third lens element which is the second nearest to the optical axis to an axial point on the image-side surface of the third lens element is denoted by SGI322. The following relations are satisfied: SGI322=−0.635293 mm and |SGI322|/(|SGI322|+TP3)=0.23981

A distance perpendicular to the optical axis between the inflection point on the object-side surface of the third lens element which is nearest to the optical axis and the optical axis is denoted by HIF311. A distance perpendicular to the optical axis from the inflection point on the image-side surface of the third lens element which is nearest to the optical axis to an axial point on the image-side surface of the third lens element is denoted by HIF321. The following relations are satisfied: HIF311=1.00019 mm, HIF311/HOI=0.25561, HIF321=1.91304 mm; HIF321/HOI=0.48889.

A distance perpendicular to the optical axis between the inflection point on the object-side surface of the third lens element which is the second nearest to the optical axis and the optical axis is denoted by HIF312. A distance perpendicular to the optical axis from the inflection point on the image-side surface of the third lens element which is the second nearest to the optical axis to an axial point on the image-side surface of the third lens element is denoted by HIF322. The following relations are satisfied: HIF322=1.99388 mm and HIF322/HOI=0.50955.

The fourth lens element 140 has negative refractive power and it is made of plastic material. The fourth lens element 140 has a concave object-side surface 142 and a convex image-side surface 144, both of the object-side surface 142 and the image-side surface 144 are aspheric, the object-side surface 142 has two inflection points. The thickness of the fourth lens element on the optical axis is TP4. The thickness of the fourth lens element at height of ½ entrance pupil diameter (HEP) is denoted by ETP4.

A distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following relations are satisfied: SGI411=−0.695261 mm and |SGI411|/(|SGI411|+TP4)=0.525310856.

A distance in parallel with an optical axis from an inflection point on the object-side surface of the fourth lens element which is the second nearest to the optical axis to an axial point on the object-side surface of the fourth lens element is denoted by SGI412. A distance in parallel with an optical axis from an inflection point on the image-side surface of the fourth lens element which is the second nearest to the optical axis to an axial point on the image-side surface of the fourth lens element is denoted by SGI422. The following relations are satisfied: SGI412=−1.15649 mm and |SGI412|/(|SGI412|+TP4)≤0.647983585

A distance perpendicular to the optical axis between the inflection point on the object-side surface of the fourth lens element which is nearest to the optical axis and the optical axis is denoted by HIF411. A distance perpendicular to the optical axis between the inflection point on the image-side surface of the fourth lens element which is nearest to the optical axis and the optical axis is denoted by HIF421. The following relations are satisfied: HIF411=1.52072 mm and HIF411/HOI=0.388632763.

A distance perpendicular to the optical axis between the inflection point on the object-side surface of the fourth lens element which is the second nearest to the optical axis and the optical axis is denoted by HIF412. A distance perpendicular to the optical axis between the inflection point on the image-side surface of the fourth lens element which is the second nearest to the optical axis and the optical axis is denoted by HIF422. The following relations are satisfied: HIF412=2.26803 mm and HIF412/HOI=0.579614107.

The fifth lens element 150 has positive refractive power and it is made of plastic material. The fifth lens element 150 has a convex object-side surface 152 and a concave image-side surface 154, both of the object-side surface 152 and the image-side surface 154 are aspheric, the object-side surface 152 and the image-side surface 154 have three inflection points respectively. The thickness of the fifth lens element on the optical axis is TP5. The thickness of the fifth lens element at height of ½ entrance pupil diameter (HEP) is denoted by ETP5.

A distance in parallel with an optical axis from an inflection point on the object-side surface of the fifth lens element which is nearest to the optical axis to an axial point on the object-side surface of the fifth lens element is denoted by SGI511. A distance in parallel with an optical axis from an inflection point on the image-side surface of the fifth lens element which is nearest to the optical axis to an axial point on the image-side surface of the fifth lens element is denoted by SGI521. The following relations are satisfied: SGI511=0.22222 mm, |SGI511|/(|SGI511|+TP5)= 0.168678174, SGI521=0.0342018 mm and |SGI521|/(|SGI521|+TP5)=0.030283111.

A distance in parallel with an optical axis from an inflection point on the object-side surface of the fifth lens element which is the second nearest to the optical axis to an axial point on the object-side surface of the fifth lens element is denoted by SGI512. A distance in parallel with an optical axis from an inflection point on the image-side surface of the fifth lens element which is the second nearest to the optical axis to an axial point on the image-side surface of the fifth lens element is denoted by SGI522. The following relations are satisfied: SGI512=0.427856 mm, |SGI512|/(|SGI512|+TP5)=0.280919415, SGI522=−0.217901 mm and |SGI522|/(|SGI522|+TP5)=0.165943823.

A distance in parallel with an optical axis from an inflection point on the object-side surface of the fifth lens element which is the third nearest to the optical axis to an axial point on the object-side surface of the fifth lens element is denoted by SGI513. A distance in parallel with an optical axis from an inflection point on the image-side surface of the fifth lens element which is the third nearest to the optical axis to an axial point on the image-side surface of the fifth lens element is denoted by SGI523. The following relations are satisfied: SGI513=0.411487 mm, |SGI513|/(|SGI513|+TP5)=0.273107155, SGI523=−0.430506 mm and |SGI523|/(|SGI523|+TP5)=0.282168386.

A distance perpendicular to the optical axis between the inflection point on the object-side surface of the fifth lens element which is nearest to the optical axis and the optical axis is denoted by HIF511. A distance perpendicular to the optical axis between the inflection point on the image-side surface of the fifth lens element which is nearest to the optical axis and the optical axis is denoted by HIF521. The following relations are satisfied: HIF511=1.15891 mm, HIF511/HOI=0.29616918, HIF521=0.684539 mm and HIF521/HOI=0.174939688.

A distance perpendicular to the optical axis between the inflection point on the object-side surface of the fifth lens element which is the second nearest to the optical axis and the optical axis is denoted by HIF512. A distance perpendicular to the optical axis between the inflection point on the image-side surface of the fifth lens element which is the second nearest to the optical axis and the optical axis is denoted by HIF522. The following relations are satisfied: HIF512=2.70019 mm, HIF512/HOI=0.41983, HIF522=2.42805 mm and HIF522/HOI=0.620508561.

A distance perpendicular to the optical axis between the inflection point on the object-side surface of the fifth lens element which is the third nearest to the optical axis and the optical axis is denoted by HIF513. A distance perpendicular to the optical axis between the inflection point on the image-side surface of the fifth lens element which is the third nearest to the optical axis and the optical axis is denoted by HIF523. The following relations are satisfied: HIF513=3.01457 mm, HIF513/HOI=0.770398671, HIF523=3.04802 mm and HIF523/HOI=0.778947099.

The sixth lens element 160 has negative refractive power and it is made of plastic material. The sixth lens element 160 has a concave object-side surface 162 and a convex image-side surface 164, the object-side surface 162 and the image-side surface 164 have two inflection points respectively. Hereby, the angle of incident of each view field on the sixth lens element can be effectively adjusted and the spherical aberration can thus be improved. The thickness of the sixth lens element on the optical axis is TP6. The thickness of the sixth lens element at height of ½ entrance pupil diameter (HEP) is denoted by ETP6.

A distance in parallel with an optical axis from an inflection point on the object-side surface of the sixth lens element which is nearest to the optical axis to an axial point on the object-side surface of the sixth lens element is denoted by SGI611. A distance in parallel with an optical axis from an inflection point on the image-side surface of the sixth lens element which is nearest to the optical axis to an axial point on the image-side surface of the sixth lens element is denoted by SGI621. The following relations are satisfied: SGI611=−0.741065 mm, |SGI611|/(|SGI611|+TP6)=0.607442278. SGI621=−0.00419714 mm and |SGI621|/(|SGI621|+TP6)=0.008687786.

A distance in parallel with an optical axis from an inflection point on the object-side surface of the sixth lens element which is the second nearest to the optical axis to an axial point on the object-side surface of the sixth lens element is denoted by SGI612. A distance in parallel with an optical axis from an inflection point on the image-side surface of the sixth lens element which is the second nearest to the optical axis to an axial point on the image-side surface of the sixth lens element is denoted by SGI622. The following relations are satisfied: SGI612=−1.07716 mm, |SGI612|/(|SGI612|+TP6)=0.692230624, SGI622=0.0958345 mm and |SGI622|/(|SGI622|+TP6)=0.166742497.

A distance perpendicular to the optical axis between the inflection point on the object-side surface of the sixth lens element which is nearest to the optical axis and the optical axis is denoted by HIF611. A distance perpendicular to the optical axis between the inflection point on the image-side surface of the sixth lens element which is nearest to the optical axis and the optical axis is denoted by HIF621. The following relations are satisfied: HIF611=2.16891 mm, HIF611/HOI=0.554283159, HIF621=0.531117 mm and HIF621/HOI=0.135731408.

A distance perpendicular to the optical axis between the inflection point on the object-side surface of the sixth lens element which is the second nearest to the optical axis and the optical axis is denoted by HIF612. A distance perpendicular to the optical axis between the inflection point on the image-side surface of the sixth lens element which is the second nearest to the optical axis and the optical axis is denoted by HIF622. The following relations are satisfied:

HIF612=2.75254 mm. HIF612/HOI=0.703434705, HIF622=2.19 mm and HIF622/HOI=0.559672885.

In the first embodiment, a horizontal distance in parallel with the optical axis from a coordinate point on the object-side surface of the first lens element at height ½ HEP to the image plane is ETL. A horizontal distance in parallel with the optical axis from a coordinate point on the object-side surface of the first lens element at height ½ HEP to a coordinate point on the image-side surface of the sixth lens element at height ½ HEP is EIN. The following relations are satisfied: ETL=8.538 mm, EIN=7.803 mm and EIN/ETL=0.914.

The first embodiment satisfies the following relations: ETP1=0.228 mm, ETP2=0.781 mm, ETP3=1.436 mm, ETP4=0.760 mm, ETP5=0.730 mm and ETP6=1.015 mm. A sum of ETP1 to ETP6 described above SETP-4.950 mm. TP1=0.606 mm. TP2=0.457 mm. TP3=2.014 mm, TP4=0.628 mm, TP5=1.095 mm and TP6=0.479 mm. A sum of TP1 to TP6 described above STP=5.280 mm. SETP/STP=0.938.

The present embodiment particularly controls the ratio relation (ΣTP/TP) of the thickness (ETP) of each lens element at height of ½ entrance pupil diameter (HEP) to the thickness (TP) of the lens element to which the surface belongs on the optical axis in order to achieve a balance between manufacturability and capability of aberration correction. The following relations are satisfied: ETP1/TP1=0.376, ETP2/TP2=1.708, ETP3/TP3=0.713, ETP4/TP4=1.209, ETP5/TP5=0.666 and ETP6/TP6=2.119.

The present embodiment controls a horizontal distance between each two adjacent lens elements at height of ½ entrance pupil diameter (HEP) to achieve a balance between the degree of miniaturization for the length of the optical image capturing system HOS, the manufacturability and the capability of aberration correction. The ratio relation (ED/IN) of the horizontal distance (ED) between the two adjacent lens elements at height of ½ entrance pupil diameter (HEP) to the horizontal distance (IN) between the two adjacent lens elements on the optical axis is particularly controlled. The following relations are satisfied: a horizontal distance in parallel with the optical axis between the first lens element and the second lens element at height of ½ entrance pupil diameter (HEP) ED12=0.765 mm a horizontal distance in parallel with the optical axis between the second lens element and the third lens element at height of ½ entrance pupil diameter (HEP) ED23=0.311 mm a horizontal distance in parallel with the optical axis between the third lens element and the fourth lens element at height of ½ entrance pupil diameter (HEP) ED34=0.159 mm a horizontal distance in parallel with the optical axis between the fourth lens element and the fifth lens element at height of ½ entrance pupil diameter (HEP) ED45=1.146 mm a horizontal distance in parallel with the optical axis between the fifth lens element and the sixth lens element at height of ½ entrance pupil diameter (HEP) ED56=0.472 mm. A sum of ED12 to ED56 described above is denoted as SED and SED=2.853 mm.

The horizontal distance between the first lens element and the second lens element on the optical axis IN12=0.827 mm. The ratio between both of them ED12/IN12=0.926. The horizontal distance between the second lens element and the third lens element on the optical axis IN23=0.556 mm. The ratio between both of them ED23/IN23=0.559. The horizontal distance between the third lens element and the fourth lens element on the optical axis IN34=0.494 mm. The ratio between both of them ED34/IN34=0.321. The horizontal distance between the fourth lens element and the fifth lens element on the optical axis IN45=0.050 mm. The ratio between both of them ED45/IN45=22.928. The horizontal distance between the fifth lens element and the sixth lens element on the optical axis IN56=0.986 mm. The ratio between both of them ED56/IN56=0.479. A sum of IN12 to IN56 described above is denoted as SIN and SIN=2.913 mm. SED/SIN=0.979.

The first embodiment also satisfies the following relations: ED12/ED23=2.464, ED23/ED34=1.959, ED34/ED45=0.138, ED45/ED56=2.429, IN12/IN23=1.486, IN23/IN34=1.126, IN34/IN45=9.880 and IN45/IN56=0.051.

A horizontal distance in parallel with the optical axis from a coordinate point on the image-side surface of the fourth lens element at height ½ HEP to the image plane EBL=0.735 mm. A horizontal distance in parallel with the optical axis from an axial point on the image-side surface of the fourth lens element to the image plane BL=0.771 mm. The embodiment of the present invention may satisfy the following relation: EBL/BL=0.9533. In the present invention, a distance in parallel with the optical axis from a coordinate point on the image-side surface of the fourth lens element at height ½ HEP to the IR-bandstop filter EIR=0.264 mm. A distance in parallel with the optical axis from an axial point on the image-side surface of the fourth lens element to the IR-bandstop filter PIR=0.300 rum. The following relation is satisfied: EIR/PIR=0.879.

The IR-bandstop filter 180 is made of glass material without affecting the focal length of the optical image capturing system and it is disposed between the sixth lens element 160 and the image plane 190.

In the optical image capturing system of the first embodiment, a focal length of the optical image capturing system is f, an entrance pupil diameter of the optical image capturing system is HEP, and half of a maximal view angle of the optical image capturing system is HAF. The detailed parameters are shown as below: f=5.291 mm, f/HEP=1.4, HAF=36° and tan(HAF)=0.7265.

In the optical image capturing system of the first embodiment, a focal length of the first lens element 110 is f1 and a focal length of the sixth lens element 160 is f6. The following relations are satisfied: f1=7.984 mm, |f/f1|=0.66264, f6=−6.182 and |f1|>f6.

In the optical image capturing system of the first embodiment, focal lengths of the second lens element 120 to the fifth lens element 150 are f2, f3, f4 and f5, respectively. The following relations are satisfied: |f2|+|f3|+|f4|+|f5|=27.91974 mm, |f1|+|f6|=14.16586 mm and |f2|+|f3|+|f4|+|f5|>|f1|+|f6|.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. In the optical image capturing system of the first embodiment, a sum of the PPR of all lens elements with positive refractive power is ΣPPR=f/f1+f/f3+f/f5=2.78137. A sum of the NPR of all lens elements with negative refractive powers is ΣNPR=f/f2+f/f4+f/f6=−2.06115, ΣPPR/|ΣNPR|=1.34942. The following relations are also satisfied: |f/f2|=0.59839, |f3|=1.26048, f/f4|=0.60694, |f/f5|=0.85825 and |f/f6|=0.85582.

In the optical image capturing system of the first embodiment, a distance from the object-side surface 112 of the first lens element to the image-side surface 164 of the sixth lens element is InTL. A distance from the object-side surface 112 of the first lens element to the image plane 190 is HOS. A distance from an aperture 100 to an image plane 190 is InS.

Half of a diagonal length of an effective detection field of the image sensing device 192 is HOI. A distance from the image-side surface 164 of the sixth lens element to the image plane 190 is BFL. The following relations are satisfied: InTL+BFL=HOS, HOS=8.965 mm, HOI=3.913 mm, HOS/HOI=2.29097, HOS/f=1.69445, InS=8.310 mm and InS/HOS=0.92700.

In the optical image capturing system of the first embodiment, a total central thickness of all lens elements with refractive power on the optical axis is ETP. The following relations are satisfied: ΣTP=5.280074 mm and ΣTP/InTL=0.64445. Hereby, contrast ratio for the image formation in the optical image capturing system and defect-free rate for manufacturing the lens element can be given consideration simultaneously, and a proper back focal length is provided to dispose other optical components in the optical image capturing system.

In the optical image capturing system of the first embodiment, a curvature radius of the object-side surface 112 of the first lens element is R1. A curvature radius of the image-side surface 114 of the first lens element is R2. The following relation is satisfied: |R1/R2|=0.059770762. Hereby, the first lens element may have proper strength of the positive refractive power, so as to avoid the longitudinal spherical aberration to increase too fast.

In the optical image capturing system of the first embodiment, a curvature radius of the object-side surface 162 of the sixth lens element is R11. A curvature radius of the image-side surface 164 of the sixth lens element is R12. The following relation is satisfied: (R11−R12)/(R11+R12)=−0.797576548. Hereby, the astigmatism generated by the optical image capturing system can be corrected beneficially.

In the optical image capturing system of the first embodiment, the focal lengths of the first lens element 110, the third lens element 130 and the fifth lens element 150 are f1, f3 and f5, respectively. A sum of focal lengths of all lens elements with positive refractive power is ΣPP. The following relations are satisfied: ΣPP=f1+f3+f5=18.34566 mm and f1/(f1+f3+f5)=0.43520. Hereby, it is favorable for allocating the positive refractive power of the first lens element 110 to other positive lens elements and the significant aberrations generated in the process of moving the incident light can be suppressed.

In the optical image capturing system of the first embodiment, the focal lengths of the second lens element 120, the fourth lens element 140 and the sixth lens element 160 are f2, f4 and f6, respectively. A sum of focal lengths of all lens elements with negative refractive power is ΣNP. The following relations are satisfied: ΣNP=f2+f4+f6=−23.73994 mm and f6/(f2+f4+f6)=0.26040. Hereby, it is favorable for allocating the negative refractive power of the sixth lens element 160 to other negative lens elements and the significant aberrations generated in the process of moving the incident light can be suppressed.

In the optical image capturing system of the first embodiment, a distance between the first lens element 110 and the second lens element 120 on the optical axis is IN12. The following relations are satisfied: IN12=0.827 mm and IN12/f=0.15624. Hereby, the chromatic aberration of the lens elements can be improved, such that the performance can be increased.

In the optical image capturing system of the first embodiment, a distance between the fifth lens element 150 and the sixth lens element 160 on the optical axis is IN56. The following relations are satisfied: IN56=0.1352 mm and IN56/f=0.18643. Hereby, the chromatic aberration of the lens elements can be improved, such that the performance can be increased.

In the optical image capturing system of the first embodiment, central thicknesses of the first lens element 110 and the second lens element 120 on the optical axis are TP1 and TP2, respectively. The following relations are satisfied: TP1=0.606 mm, TP2=0.457 mm and (TP1+IN12)/TP2=3.13304. Hereby, the sensitivity produced by the optical image capturing system can be controlled, and the performance can be increased.

In the optical image capturing system of the first embodiment, central thicknesses of the fifth lens element 150 and the sixth lens element 160 on the optical axis are TP5 and TP6, respectively, and a distance between the aforementioned two lens elements on the optical axis is IN56. The following relations are satisfied: TP5=1.095 mm, TP6=0.479 mm and (TP6+IN56)/TP5=1.33788. Hereby, the sensitivity produced by the optical image capturing system can be controlled and the total height of the optical image capturing system can be reduced.

In the optical image capturing system of the first embodiment, a distance between the third lens element 130 and the fourth lens element 140 on the optical axis is IN34. A distance between the fourth lens element 140 and the fifth lens element 150 on the optical axis is IN45. The following relations are satisfied: IN34=0.494 mm. IN45=0.050 mm and TP4/(IN34+TP4+IN45)=0.53594. Hereby, the aberration generated by the process of moving the incident light can be adjusted slightly layer upon layer, and the total height of the optical image capturing system can be reduced.

In the optical image capturing system of the first embodiment, a distance in parallel with an optical axis from a maximum effective half diameter position to an axial point on the object-side surface 152 of the fifth lens element is InRS51. A distance in parallel with an optical axis from a maximum effective half diameter position to an axial point on the image-side surface 154 of the fifth lens element is InRS52. A central thickness of the fifth lens element 150 is TP5. The following relations are satisfied: InRS51=0.39477 mm, InRS52=−0.50049 mm, |InRS51|/TP5=0.36045 and |InRS52|/TP5=0.45699. Hereby, it is favorable for manufacturing and forming the lens element and for maintaining the minimization for the optical image capturing system.

In the optical image capturing system of the first embodiment, a distance perpendicular to the optical axis between a critical point C51 on the object-side surface 152 of the fifth lens element and the optical axis is HVT51. A distance perpendicular to the optical axis between a critical point C52 on the image-side surface 154 of the fifth lens element and the optical axis is HVT52. The following relations are satisfied: HVT51=2.345 mm. HVT52=1.240 mm and HVT51 HVT52=1.890717609.

In the optical image capturing system of the first embodiment, a distance in parallel with an optical axis from a maximum effective half diameter position to an axial point on the object-side surface 162 of the sixth lens element is InRS61. A distance in parallel with an optical axis from a maximum effective half diameter position to an axial point on the image-side surface 164 of the sixth lens element is InRS62. A central thickness of the sixth lens element 160 is TP6. The following relations are satisfied: InRS61=−1.43693 mm, InRS62=−0.14688 mm, |InRS61|/TP6=3.00041 and |InRS62|/TP6=0.30670. Hereby, it is favorable for manufacturing and forming the lens element and for maintaining the minimization for the optical image capturing system.

In the optical image capturing system of the first embodiment, a distance perpendicular to the optical axis between a critical point C61 on the object-side surface 162 of the sixth lens element and the optical axis is HVT61. A distance perpendicular to the optical axis between a critical point C62 on the image-side surface 164 of the sixth lens element and the optical axis is HVT62. The following relations are satisfied: HVT61=0 mm and HVT62=0 mm.

In the optical image capturing system of the first embodiment, the following relation is satisfied: HVT52/HOI=0.31691541. Hereby, the aberration of surrounding view field can be corrected.

In the optical image capturing system of the first embodiment, the following relation is satisfied: HVT52/HOS=0.138332655. Hereby, the aberration of surrounding view field can be corrected.

In the optical image capturing system of the first embodiment, the second lens element 120, the third lens element 130 and the sixth lens element 160 have negative refractive power. An Abbe number of the second lens element is NA2. An Abbe number of the third lens element is NA3. An Abbe number of the sixth lens element is NA6. The following relation is satisfied: NA6/NA2≤1. Hereby, the chromatic aberration of the optical image capturing system can be corrected.

In the optical image capturing system of the first embodiment, TV distortion and optical distortion for image formation in the optical image capturing system are TDT and ODT, respectively. The following relations are satisfied: |TDT|=1.06122% and |ODT|=2.03663%.

In the optical image capturing system of the present embodiment, contrast transfer rates of modulation transfer with half frequencies (MTF values) at the optical axis on the image plane, 0.3 HOI and 0.7 HOI (Pixel Size is 1.12 μm) are respectively denoted by MTFH0, MTFH3 and MTFH7. The following relations are satisfied: MTFH0 is about 0.475, MTFH3 is about 0.2 and MTFH7 is about 0.3.

Please refer to the following Table 1 and Table 2.

The detailed data of the optical image capturing system of the first embodiment is as shown in Table 1.

TABLE 1

Data of the optical image capturing system
f = 5.291 mm, f/HEP = 1.4, HAF = 36 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 4.255731799 | 0.606 | Plastic | 1.565 | 58.00 | 7.984 |
| 2 | | 71.19250307 | 0.048 | | | | |
| 3 | Ape. stop | Plano | 0.779 | | | | |
| 4 | Lens 2 | 6.079083591 | 0.457 | Plastic | 1.650 | 21.40 | −8.841 |
| 5 | | 2.866583348 | 0.556 | | | | |
| 6 | Lens 3 | 10.20200107 | 2.014 | Plastic | 1.565 | 58.00 | 4.197 |
| 7 | | −2.869444336 | 0.494 | | | | |
| 8 | Lens 4 | −1.06118402 | 0.628 | Plastic | 1.565 | 58.00 | −8.717 |
| 9 | | −1.641745207 | 0.050 | | | | |
| 10 | Lens 5 | 2.301213082 | 1.095 | Plastic | 1.565 | 58.00 | 6.164 |
| 11 | | 5.617314102 | 0.986 | | | | |
| 12 | Lens 6 | −3.175614787 | 0.479 | Plastic | 1.583 | 30.20 | −6.182 |
| 13 | | −28.20027299 | 0.300 | | | | |
| 14 | IR-bandstop filter | Plano | 0.200 | | 1.517 | 64.13 | |
| 15 | | Plano | 0.271 | | | | |
| 16 | Image plane | Plano | | | | | |

Reference wavelength (d-line) = 555 nm, shield position: clear aperture (CA) of the first plano = 1.8 mm; clear aperture (CA) of the fourth plano = 1.7 mm As for the parameters of the aspheric surfaces of the first embodiment, reference is made to Table 2.

TABLE 2

Aspheric Coefficients

| Surface # | 1 | 2 | 4 | 5 | 6 | 7 | 8 |
|---|---|---|---|---|---|---|---|
| k | 2.635420E+00 | 4.457762E+01 | −4.604555E+01 | −6.932651E+00 | −5.000000E+01 | −3.076359E+00 | −2.756657E+00 |
| A4 | −1.929774E−03 | 6.768194E−04 | −1.480874E−02 | −9.429077E−03 | −2.913443E−03 | −1.258237E−02 | −2.569286E−03 |
| A6 | 1.059340E−04 | 1.070392E−03 | −2.201509E−03 | 1.285035E−03 | −7.601389E−04 | 2.237482E−03 | 4.972677E−04 |
| A8 | −6.252834E−05 | −2.356378E−04 | 9.922395E−04 | −2.588209E−04 | 1.404797E−04 | 1.225744E−04 | 2.493365E−04 |
| A10 | −1.162103E−06 | 3.598200E−05 | −2.060670E−04 | 4.991796E−06 | −5.568198E−05 | −3.420430E−05 | −3.335771E−05 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| Surface # | 9 | 10 | 11 | 12 | 13 |
|---|---|---|---|---|---|
| k | −3.279453E+00 | −5.716761E+00 | −2.385377E+01 | −2.277420E−01 | 2.251364E+01 |
| A4 | −6.969650E−03 | −6.411949E−03 | −2.019070E−02 | −1.868726E−03 | 9.919009E−03 |
| A6 | −1.216002E−04 | −5.364741E−04 | −4.749095E−04 | 1.280191E−03 | 1.320671E−03 |
| A8 | 1.617237E−05 | −4.025565E−05 | 3.458499E−04 | −3.395867E−05 | −6.754709E−04 |

TABLE 2-continued

Aspheric Coefficients

| A10 | −3.938320E−06 | 1.545342E−05 | −3.215010E−05 | 6.555775E−06 | 8.735977E−05 |
| A12 | 0.000000E+00 | −2.219056E−07 | 2.373800E−06 | −9.169562E−07 | −4.931073E−06 |
| A14 | 0.000000E+00 | −3.868807E−08 | −1.041595E−07 | 2.985638E−08 | 1.0253.56E−07 |

Table 1 is the detailed structure data to the first embodiment in FIG. 1A, wherein the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, wherein k is the conic coefficient in the aspheric surface formula, and A1-A20 are the first to the twentieth order aspheric surface coefficient. Besides, the tables in the following embodiments are referenced to the schematic view and the aberration graphs, respectively, and definitions of parameters in the tables are equal to those in the Table 1 and the Table 2, so the repetitious details will not be given here.

The Second Embodiment (Embodiment 2)

Figure 2A:
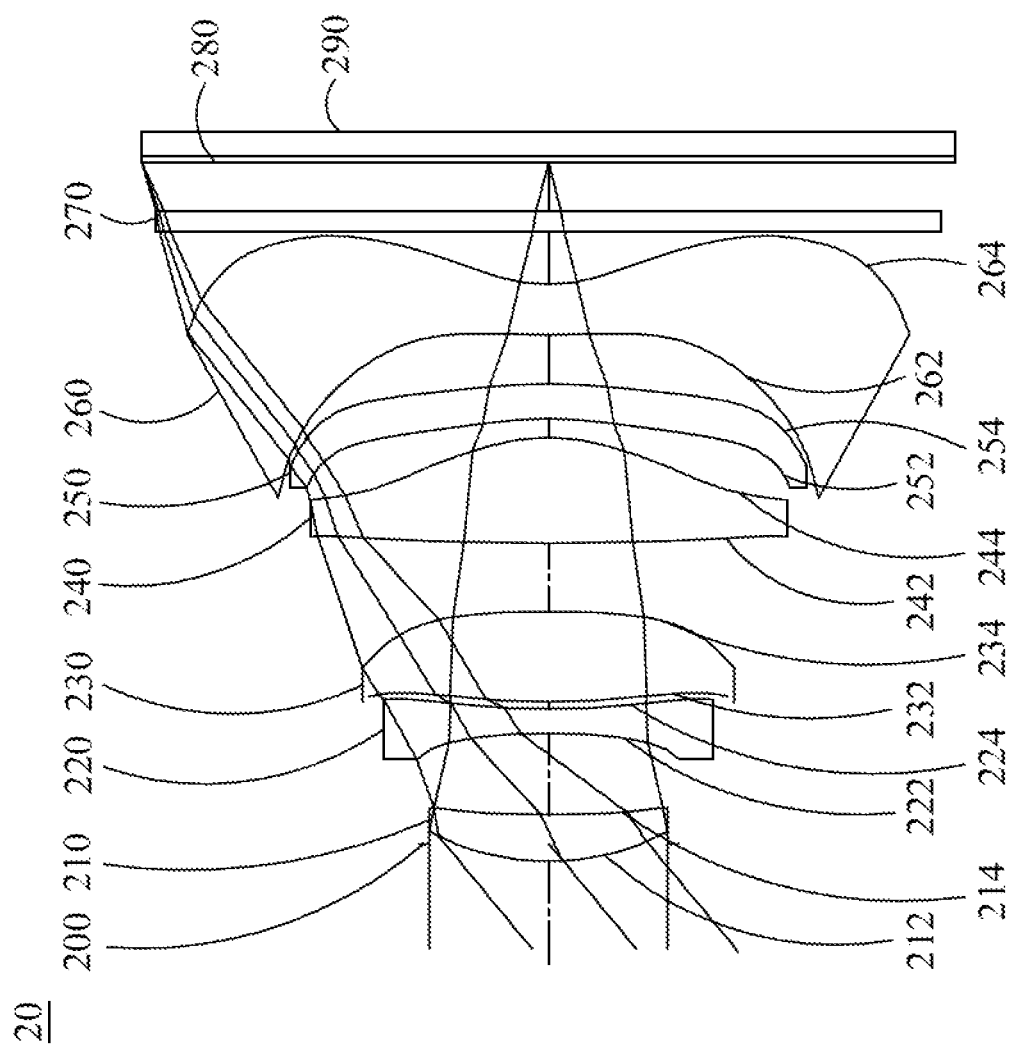
FIG. 2A is a schematic view of the optical image capturing system according to the second embodiment of the present application.
Figure 2B:
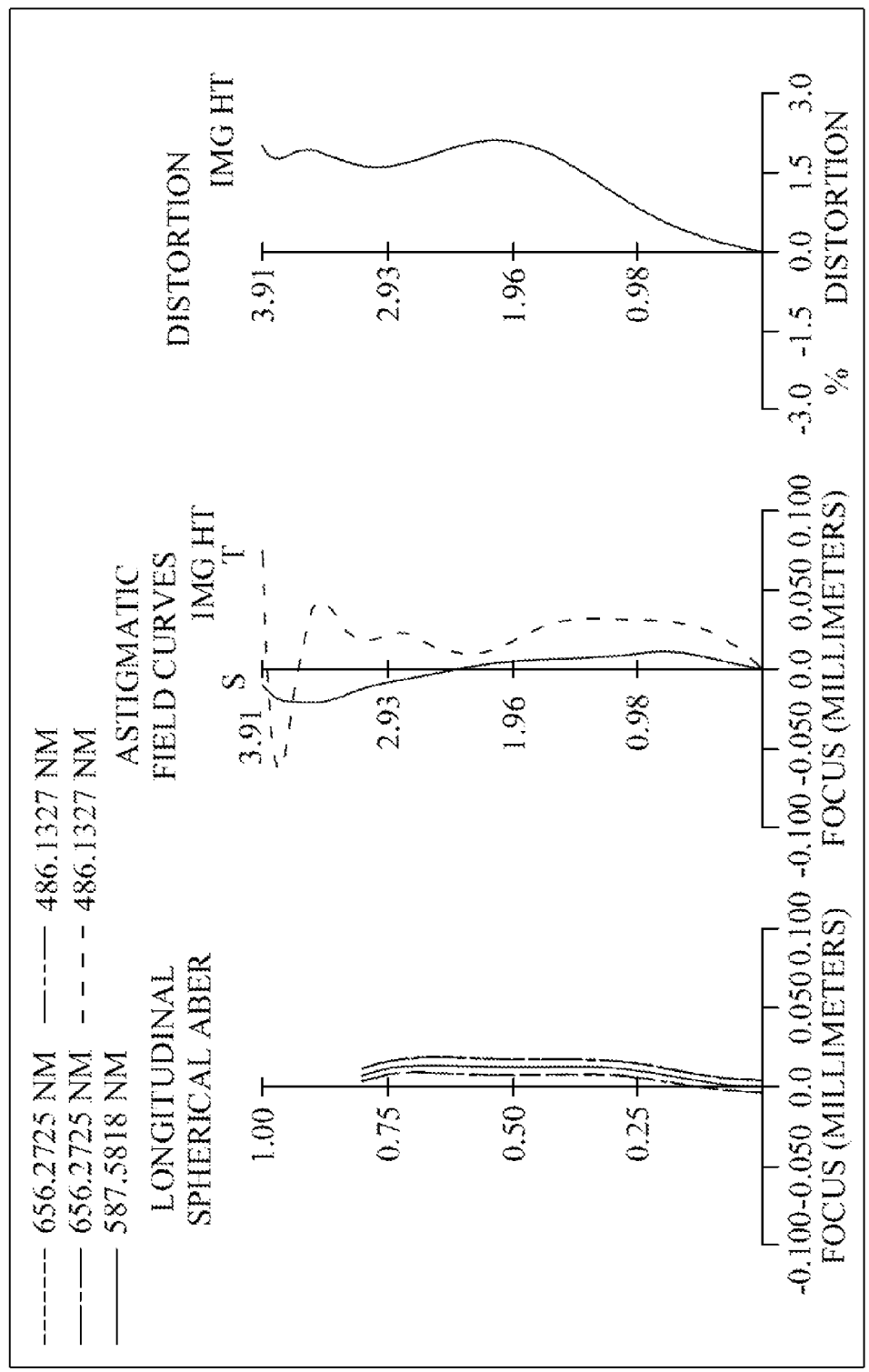
FIG. 2B is longitudinal spherical aberration curves, astigmatic field curves, and an optical distortion grid of the optical image capturing system in the order from left to right according to the second embodiment of the present application.
Figure 2C:
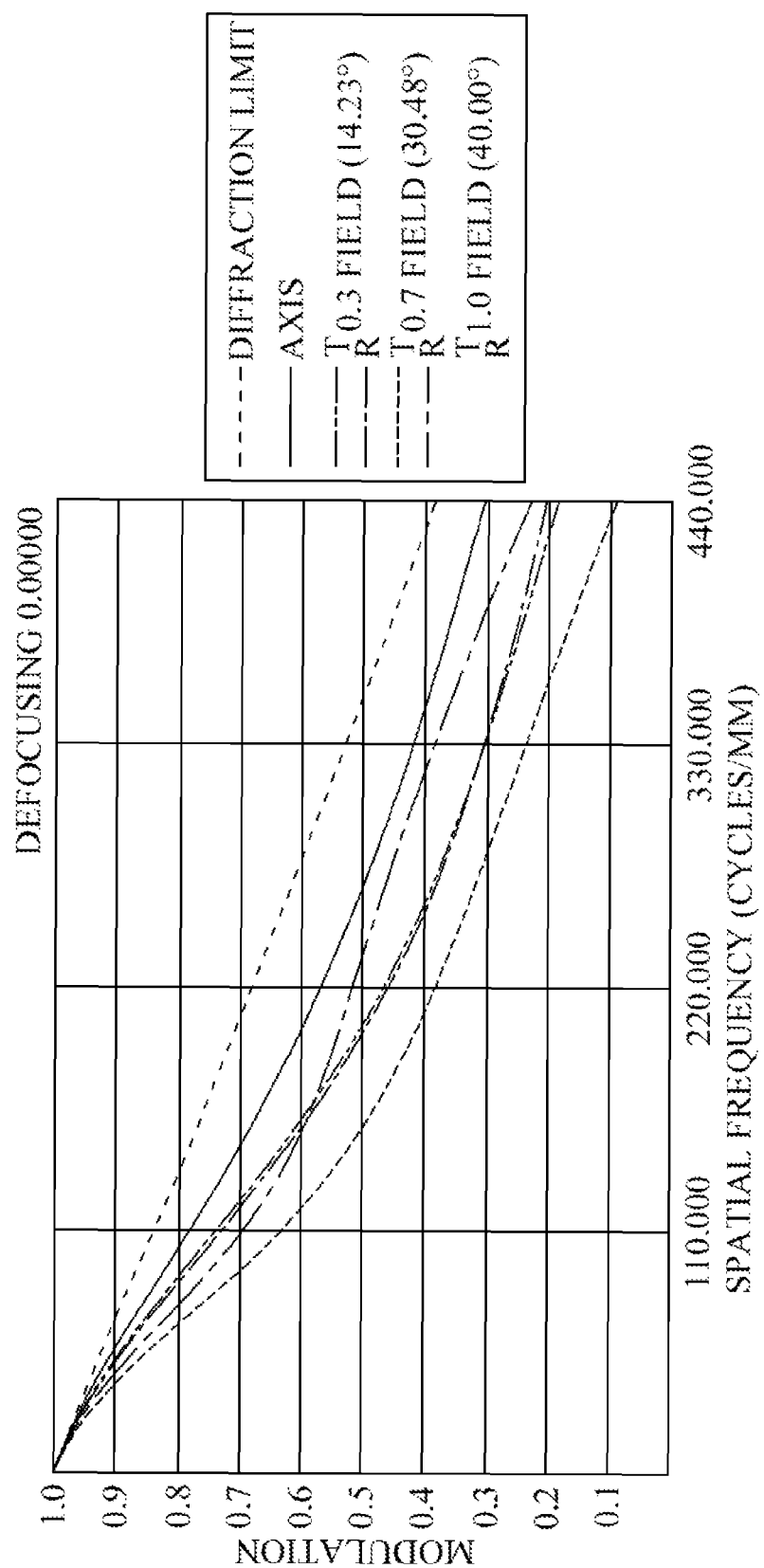
FIG. 2C is a characteristic diagram of modulation transfer according to the second embodiment of the present application.

Please refer to FIG. 2A, FIG. 2B and FIG. 2C, FIG. 2A is a schematic view of the optical image capturing system according to the second embodiment of the present application. FIG. 2B is longitudinal spherical aberration curves, astigmatic field curves, and an optical distortion curve of the optical image capturing system in the order from left to right according to the second embodiment of the present application, and FIG. 2C is a characteristic diagram of modulation transfer according to the second embodiment of the present application. As shown in FIG. 2A, in order from an object side to an image side, the optical image capturing system includes an aperture stop 200, a first lens element 210, a second lens element 220, a third lens element 230, a fourth lens element 240, a fifth lens element 250, a sixth lens element 260, an IR-bandstop filter 280, an image plane 290, and an image sensing device 292.

The first lens element 210 has positive refractive power and it is made of plastic material. The first lens element 210 has a convex object-side surface 212 and a concave image-side surface 214, both of the object-side surface 212 and the image-side surface 214 are aspheric.

The second lens element 220 has negative refractive power and it is made of plastic material. The second lens element 220 has a concave object-side surface 222 and a concave image-side surface 224, both of the object-side surface 222 and the image-side surface 224 are aspheric. The image-side surface 224 has an inflection point.

The third lens element 230 has positive refractive power and it is made of plastic material. The third lens element 230 has a convex object-side surface 232 and a convex image-side surface 234, and both of the object-side surface 232 and the image-side surface 234 are aspheric. The object-side surface 232 has an inflection point.

The fourth lens element 240 has positive refractive power and it is made of plastic material. The fourth lens element 240 has a convex object-side surface 242 and a convex image-side surface 244, both of the object-side surface 242 and the image-side surface 244 are aspheric, and the object-side surface 242 has an inflection point and the image-side surface 244 has two inflection points.

The fifth lens element 250 has negative refractive power and it is made of plastic material. The fifth lens element 250 has a concave object-side surface 252 and a convex image-side surface 254, both of the object-side surface 252 and the image-side surface 254 are aspheric, and the object-side surface 252 have two inflection points.

The sixth lens element 260 has negative refractive power and it is made of plastic material. The sixth lens element 260 has a convex object-side surface 262 and a concave image-side surface 264. Hereby, the back focal length is reduced to miniaturize the lens element effectively. In addition, the object-side surface 262 and the image-side surface 264 have an inflection point respectively. Thus, the angle of incident with incoming light from an off-axis view field can be suppressed effectively and the aberration in the off-axis view field can be corrected further.

The IR-bandstop filter 280 is made of glass material without affecting the focal length of the optical image capturing system and it is disposed between the sixth lens element 260 and the image plane 290.

In the optical image capturing system of the second embodiment, focal lengths of the second lens element 220 through the sixth lens element 260 are f2, f3, f4, f5 and f6 respectively. The following relations are satisfied: |f2|+|f3|+|f4|+|f5|=114.412 mm. |f1|+|f6|=9.334 mm and |f2|+|f3|+|f4|+|f5|>|f1|+|f6|.

In the optical image capturing system of the second embodiment, the first lens element 210, the third lens element 230 and the fourth lens element 240 are positive lens elements, and focal lengths of the first lens element 210, the third lens element 230 and the fourth lens element 240 are f1, f3 and f4, respectively. A sum of focal lengths of all lens elements with positive refractive power is ΣPP. The following relations is satisfied: ΣPP=f1+f3+f4=15.98200 mm and f1/(f1+f3+f4)=0.39013. Hereby, it is favorable for allocating the positive refractive power of the first lens element 210 to other positive lens elements and the significant aberrations generated in the process of moving the incident light can be suppressed.

In the optical image capturing system of the second embodiment, focal lengths of the second lens element 220, the fifth lens element 250 and the sixth lens element 260 are f2, f5 and f6, respectively. A sum of focal lengths of all lens elements with negative refractive power is ΣNP. The following relation is satisfied: ΣNP=f2+f5+f6=−107.76400 mm and f6/(f2+f5+f6)=0.02876. Hereby, it is favorable for allocating the negative refractive power of the sixth lens element 260 to other negative lens elements.

In the optical image capturing system of the present embodiment, contrast transfer rates of modulation transfer with half frequencies (MTF values) at the optical axis on the image plane, 0.3 HOI and 0.7 HOI are respectively denoted by MTFH0, MTFH3 and MTFH7. The following relations are satisfied: MTFH0 is about 0.575, MTFH3 is about 0.475 and MTFH7 is about 0.38.

Please refer to the following Table 3 and Table 4.

The detailed data of the optical image capturing system of the second embodiment is as shown in Table 3.

TABLE 3

Data of the optical image capturing system
f = 4.564 mm; f/HEP = 1.6; HAF = 40.004 deg

| Surface # | | Curvature Radius | Thickness | Material | Index | Abbe # | Focal length |
|---|---|---|---|---|---|---|---|
| 0 | Object | Plano | At infinity | | | | |
| 1 | Shading sheet | Plano | 1.000 | | | | |
| 2 | Ape. stop | Plano | −0.161 | | | | |
| 3 | Lens 1 | 2.735365343 | 0.437 | Plastic | 1.565 | 58.00 | 6.235 |
| 4 | | 11.4073644 | 0.781 | | | | |
| 5 | Lens 2 | −5.561379941 | 0.230 | Plastic | 1.607 | 26.60 | −5.113 |
| 6 | | 7.243982675 | 0.065 | | | | |
| 7 | Lens 3 | 4.789841928 | 0.867 | Plastic | 1.650 | 21.40 | 6.390 |
| 8 | | −13.87829673 | 0.653 | | | | |
| 9 | Lens 4 | 24.23819525 | 1.007 | Plastic | 1.565 | 58.00 | 3.357 |
| 10 | | −2.033935718 | 0.183 | | | | |
| 11 | Lens 5 | −4.043527926 | 0.328 | Plastic | 1.583 | 30.20 | −99.552 |
| 12 | | −4.474848182 | 0.473 | | | | |
| 13 | Lens 6 | 8.493807536 | 0.482 | Plastic | 1.550 | 56.50 | −3.099 |
| 14 | | 1.394730871 | 0.500 | | | | |
| 15 | IR-bandstop filter | Plano | 0.200 | | 1.517 | 64.13 | |
| 16 | | Plano | 0.462 | | | | |
| 17 | Image plane | Plano | | | | | |

Reference wavelength (d-line) = 555 nm,
shield position:
clear aperture (CA) of the first piano = 1.87 mm;
clear aperture (CA) of the fourth piano = 1.1 nm As for the parameters of the aspheric surfaces of the second embodiment, reference is made to Table 4.

TABLE 4

Aspheric Coefficients

| Surface # | 3 | 4 | 5 | 6 |
|---|---|---|---|---|
| k | 6.682872E−02 | 4.042272E+00 | 1.571721E+01 | −2.879241E+01 |
| A4 | 8.913493E−03 | 9.452095E−03 | 2.285287E−02 | −9.031573E−04 |
| A6 | 3.652845E−03 | −1.406496E−03 | −2.968202E−02 | 3.190600E−03 |
| A8 | 1.363050E−04 | 3.378522E−03 | 1.075936E−02 | −3.455606E−03 |
| A10 | 5.012858E−04 | −1.750267E−03 | −4.123822E−03 | 4.505392E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |

| Surface # | 7 | 8 | 9 | 10 |
|---|---|---|---|---|
| k | −4.126118E+01 | 4.969861E+01 | 4.478388E+01 | −9.773531E−01 |
| A4 | −1.478601E−02 | −2.709077E−02 | −7.079047E−03 | 2.166148E−07 |
| A6 | 3.589529E−03 | −2.627408E−03 | 1.352751E−03 | 2.062604E−03 |
| A8 | −3.454063E−04 | −6.827442E−06 | 2.268094E−04 | 1.473932E−06 |
| A10 | −2.648290E−04 | −2.335654E−05 | −5.785681E−05 | −4.946366E−05 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |

| Surface # | 11 | 12 | 13 | 14 |
|---|---|---|---|---|
| k | 1.889603E+00 | −4.964951E+01 | −4.106001E+01 | −4.404653E+00 |
| A4 | 3.326401E−02 | 8.244.289E−03 | −6.363072E−02 | −3.122088E−02 |
| A6 | −1.743814E−03 | −2.374963E−03 | 7.070063E−03 | 5.012374E−03 |
| A8 | −9.717081E−05 | −6.156889E−05 | −4.919852E−04 | −5.078199E−04 |
| A10 | −7.539415E−05 | 8.670765E−06 | 6.337320E−05 | 1.563767E−05 |
| A12 | −3.006321E−06 | −1.944037E−06 | 5.315898E−06 | 1.235919E−06 |
| A14 | 1.953352E−06 | −4.383711E−07 | −2.271187E−06 | −8.857361E−08 |

In the second embodiment, the presentation of the aspheric surface formula is similar to that in the first embodiment. Besides, the definitions of parameters in following tables are equal to those in the first embodiment, so the repetitious details will not be given here.

The following contents may be deduced from Table 3 and Table 4.

| Second embodiment (Primary reference wavelength = 555 nm) | | | | | |
|---|---|---|---|---|---|
| ETP1 | ETP2 | ETP3 | ETP4 | ETP5 | ETP6 |
| 0.233 | 0.471 | 0.684 | 0.706 | 0.361 | 0.800 |
| ETP1/TP1 | ETP2/TP2 | ETP3/TP3 | ETP4/TP4 | ETP5/TP5 | ETP6/TP6 |
| 0.534 | 2.049 | 0.789 | 0.701 | 1.099 | 1.661 |
| ETL | EBL | EIN | EIR | PIR | EIN/ETL |
| 6.390 | 0.872 | 5.518 | 0.210 | 0.500 | 0.864 |
| SETP/EIN | EIR/PIR | SETP | STP | SETP/STP | BL |
| 0.590 | 0.419 | 3.256 | 3.351 | 0.972 | 1.161 |
| ED12 | ED23 | ED34 | ED45 | ED56 | EBL/BL |
| 0.541 | 0.067 | 0.778 | 0.344 | 0.532 | 0.7511 |
| SED | SIN | SED/SIN | | | |
| 2.263 | 2.156 | 1.050 | | | |
| ED12/IN12 | ED23/IN23 | ED34/IN34 | ED45/IN45 | ED56/IN56 | |
| 0.693 | 1.030 | 1.190 | 1.881 | 1.126 | |
| \| f/f1 \| | \| f/f2 \| | \| f/f3 \| | \| f/f4 \| | \| f/f5 \| | \| f/f6 \| |
| 0.73200 | 0.89263 | 0.71424 | 1.35955 | 0.04585 | 1.47273 |
| ΣPPR | ΣNPR | ΣPPR/\|ΣNPR\| | IN12/f | IN56/f | TP4/(IN34 + TP4 + IN45) |
| 2.80579 | 2.41121 | 1.16364 | 0.17112 | 0.10364 | 0.54639 |
| \| f1/f2 \| | \| f2/f3 \| | (TP1 + IN12)/TP2 | | (TP6 + IN56)/TP5 | |
| 1.21944 | 0.80016 | 5.29565 | | 2.91159 | |
| HOS | InTL | HOS/HOI | InS/HOS | \| ODT \| % | \| TDT \| % |
| 6.66700 | 5.50600 | 1.70381 | 0.97585 | 2.08400 | 0.45500 |
| HVT51 | HVT52 | HVT61 | HVT62 | HVT62/HOI | HVT62/HOS |
| 0 | 0 | 0.66800 | 2.11500 | 0.54051 | 0.31723 |
| TP2/TP3 | TP3/TP4 | InRS61 | InRS62 | \| InRS61 \|/TP6 | \| InRS62 \|/TP6 |
| 0.26528 | 0.86097 | −1.19700 | −0.47100 | 2.48340 | 0.97718 |

The following contents may be deduced from Table 3 and Table 4.

| Related inflection point values of second embodiment (Primary reference wavelength: 555 nm) | | | | | | | |
|---|---|---|---|---|---|---|---|
| HIF221 | 1.0090 | HIF221/HOI | 0.2579 | SGI221 | 0.0620 | \|SGI221\|/(\|SGI221\| + TP2) | 0.2123 |
| HIF311 | 0.7600 | HIF311/HOI | 0.1942 | SGI311 | 0.0460 | \|SGI311\|/(\|SGI311\| + TP3) | 0.0504 |
| HIF411 | 1.9030 | HIF411/HOI | 0.4863 | SGI411 | 0.0550 | \|SGI411\|/(\|SGI411\| + TP4) | 0.0518 |
| HIF421 | 1.2150 | HIF421/HOI | 0.3105 | SGI421 | −0.3100 | \|SGI421\|/(\|SGI421\| + TP4) | 0.2354 |
| HIF422 | 2.1470 | HIF422/HOI | 0.5487 | SGI422 | −0.5800 | \|SGI422\|/(\|SGI422\| + TP4) | 0.3655 |
| HIF511 | 0.9880 | HIF511/HOI | 0.2525 | SGI511 | −0.0960 | \|SGI511\|/(\|SGI511\| + TP5) | 0.2264 |
| HIF512 | 1.3670 | HIF512/HOI | 0.3493 | SGI512 | −0.1520 | \|SGI512\|/(\|SGI512\| + TP5) | 0.3167 |
| HIF611 | 0.3780 | HIF611/HOI | 0.0966 | SGI611 | 0.0070 | \|SGI611\|/(\|SGI611\| + TP6) | 0.0143 |
| HIF621 | 0.8610 | HIF621/HOI | 0.2200 | SGI621 | 0.1960 | \|SGI621\|/(\|SGI621\| + TP6) | 0.2891 |

The Third Embodiment (Embodiment 3)

Figure 3A:
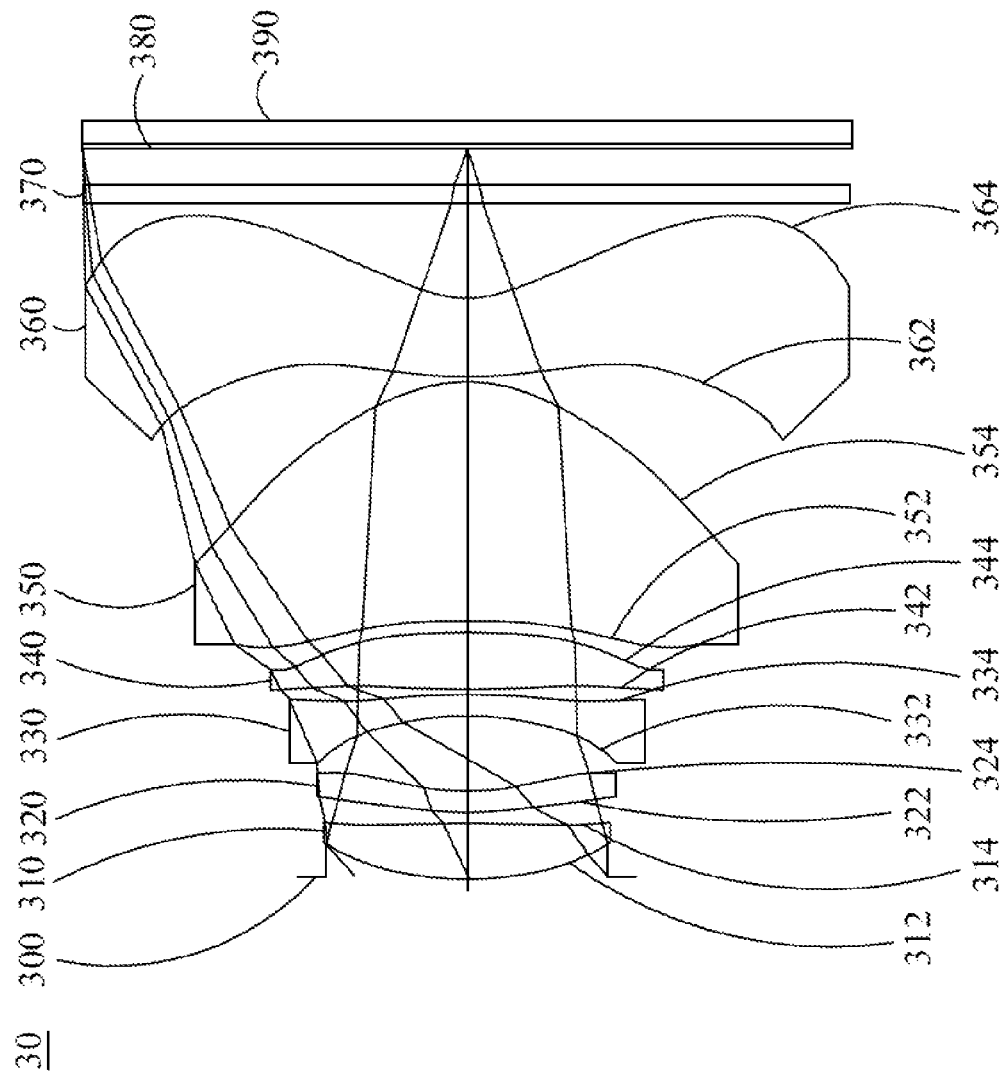
FIG. 3A is a schematic view of the optical image capturing system according to the third embodiment of the present application.
Figure 3B:
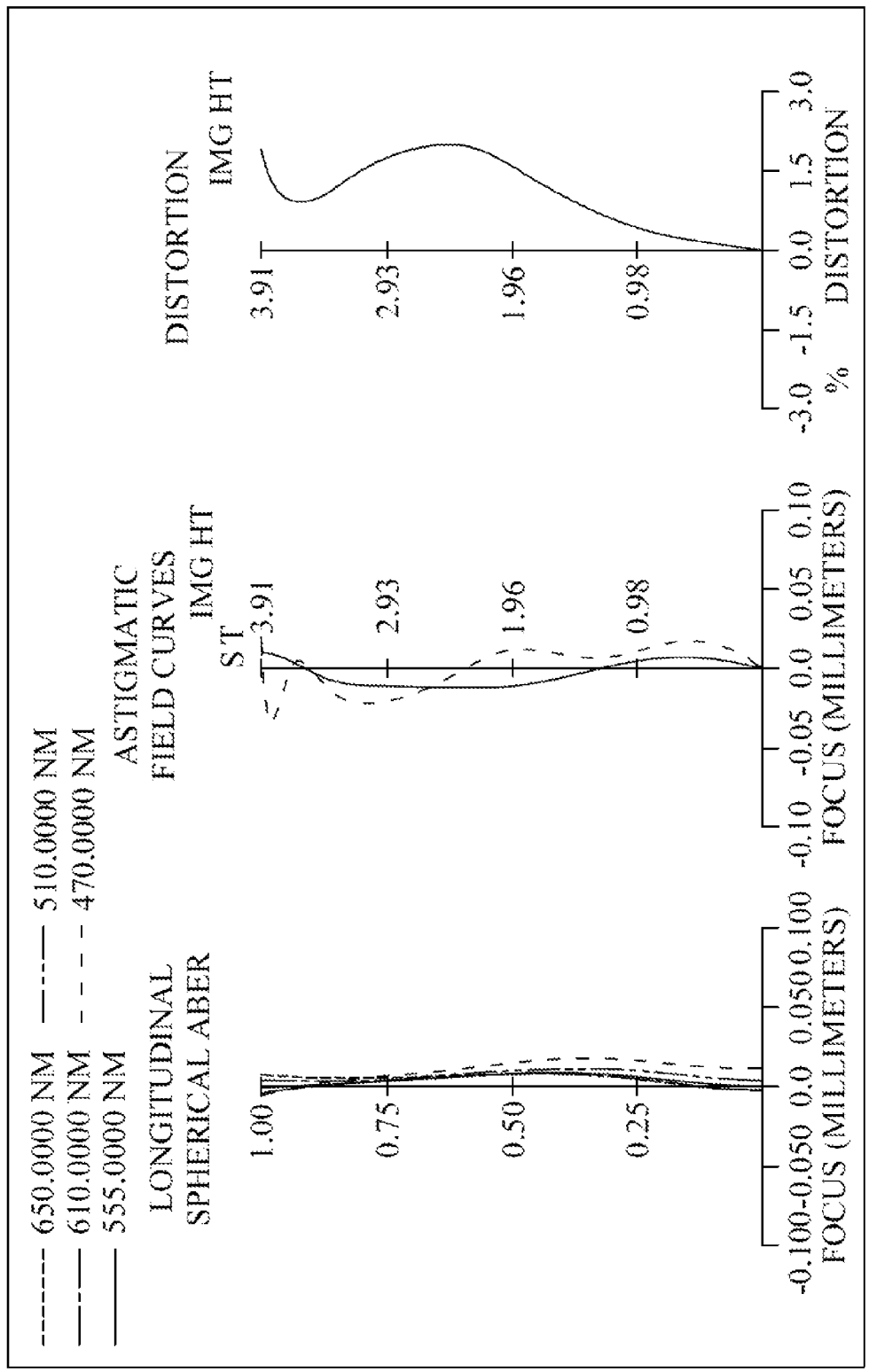
FIG. 3B is longitudinal spherical aberration curves, astigmatic field curves, and an optical distortion grid of the optical image capturing system in the order from left to right according to the third embodiment of the present application.
Figure 3C:
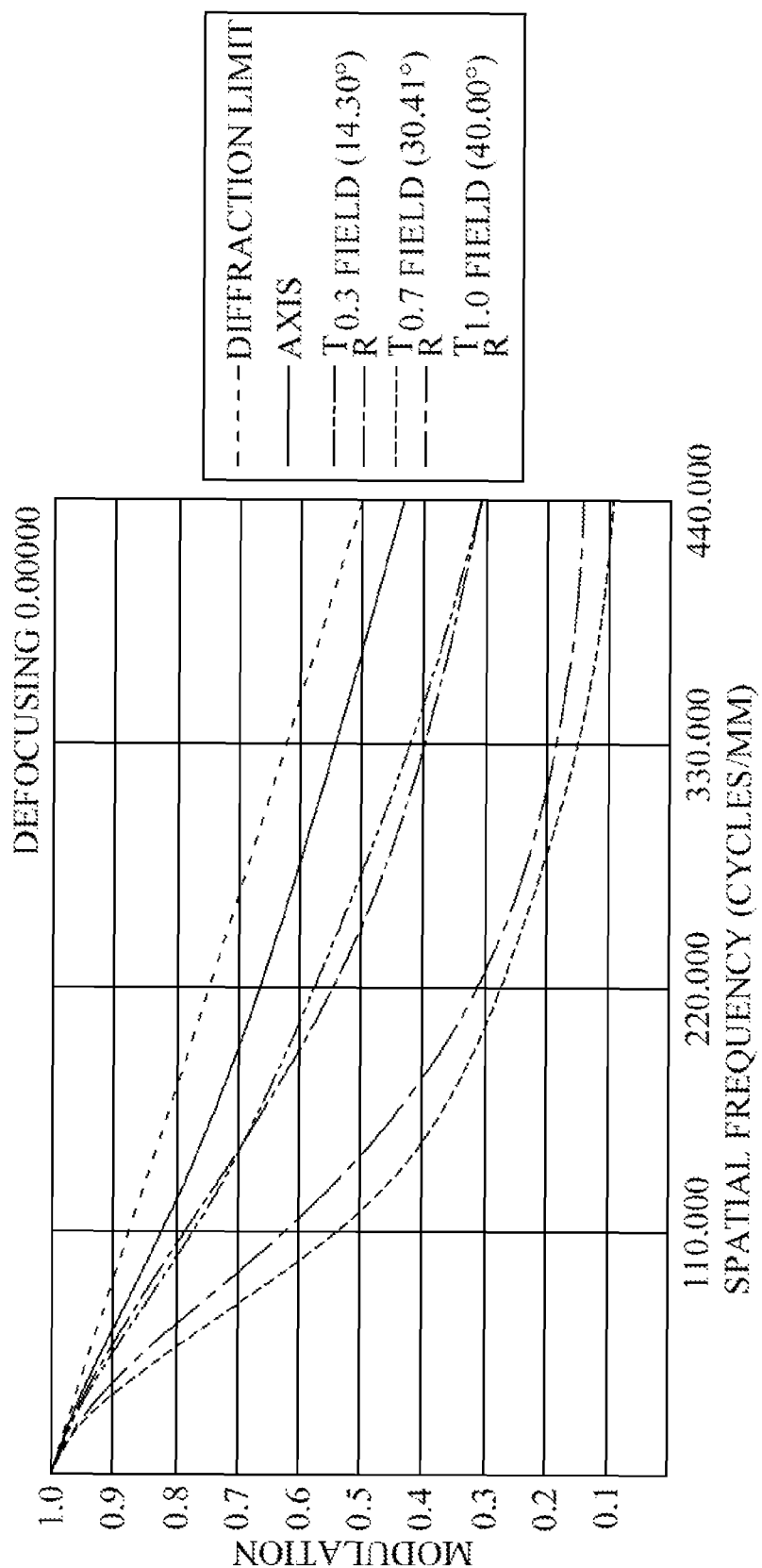
FIG. 3C is a characteristic diagram of modulation transfer according to the third embodiment of the present application.

Please refer to FIG. 3A, FIG. 3B and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a characteristic diagram of modulation transfer according to the third embodiment of the present application. As shown in FIG. 3A, in order from an object side to an image side, the optical image capturing system includes an aperture stop 300, a first lens element 310, a second lens element 320, a third lens element 330, a fourth lens element 340, a fifth lens element 350, a sixth lens element 360, an IR-bandstop filter 380, an image plane 390, and an image sensing device 392.

The first lens element 310 has positive refractive power and it is made of plastic material. The first lens element 310 has a convex object-side surface 312 and a convex image-side surface 314, both of the object-side surface 312 and the image-side surface 314 are aspheric. The image-side surface 314 has an inflection point.

The second lens element 320 has negative refractive power and it is made of plastic material. The second lens element 320 has a convex object-side surface 322 and a concave image-side surface 324, both of the object-side surface 322 and the image-side surface 324 are aspheric. The object-side surface 322 has two inflection points and the image-side surface 324 has an inflection point.

The third lens element 330 has negative refractive power and it is made of plastic material. The third lens element 330 has a concave object-side surface 332 and a convex image-side surface 334, both of the object-side surface 332 and the image-side surface 334 are aspheric. The image-side surface 334 has two inflection points.

The fourth lens element 340 has positive refractive power and it is made of plastic material. The fourth lens element 340 has a convex object-side surface 342 and a convex image-side surface 344, both of the object-side surface 342 and the image-side surface 344 are aspheric. The object-side surface 342 and the image-side surface 344 have an inflection point respectively.

The fifth lens element 350 has positive refractive power and it is made of plastic material. The fifth lens element 350 has a concave object-side surface 352 and a convex image-side surface 354, both of the object-side surface 352 and the image-side surface 354 are aspheric, and the object-side surface 352 and the image-side surface 354 have an inflection point respectively.

The sixth lens element 360 has negative refractive power and it is made of plastic material. The sixth lens element 360 has a convex object-side surface 362 and a concave image-side surface 364. Hereby, the back focal length is reduced to miniaturize the lens element effectively. In addition, the object-side surface 362 and the image-side surface 364 have an inflection point respectively. Thus, the angle of incident with incoming light from an off-axis view field can be suppressed effectively and the aberration in the off-axis view field can be corrected further.

The IR-bandstop filter 380 is made of glass material without affecting the focal length of the optical image capturing system and it is disposed between the sixth lens element 360 and the image plane 390.

In the optical image capturing system of the third embodiment, focal lengths of the second lens element 320 through the sixth lens element 360 are 2, f3, f4, f5 and f6 respectively. The following relations are satisfied: |f2|+|f3|+|f4|+|f5|=32.283 mm, |f1|+|f6|=7.554 mm and |f2|+|f3|+|f4|+|f5|>|f1|+|f6|.

In the optical image capturing system of the third embodiment, focal lengths of the first lens element 310, the fourth lens element 340 and the fifth lens element 350 are f1, f4 and f5, respectively. A sum of focal lengths of all lens elements with positive refractive power is ΣPP. The following relation is satisfied: PP=f1+f4+f5=15.92100 mm and f1/(f1+f4+f5)= 0.30394 mm. Hereby, it is favorable for allocating the positive refractive power of the first lens element 310 to other positive lens elements and the significant aberrations generated in the process of moving the incident light can be suppressed.

In the optical image capturing system of the third embodiment, focal lengths of the second lens element 320, the third lens element 330 and the sixth lens element 360 are f2, f3 and f6, respectively. A sum of focal lengths of all lens elements with negative refractive power is ΣNP. The following relation is satisfied: ΣNP=f2+f3+f6=−23.91600 mm and f6/(2+f3+f3+f6)=0.11352. Hereby, it is favorable for allocating the negative refractive power of the sixth lens element 360 to other negative lens elements.

In the optical image capturing system of the present embodiment, contrast transfer rates of modulation transfer with half frequencies (MTF values) at the optical axis on the image plane, 0.3 HOI and 0.7 HOI are respectively denoted by MTFH0, MTFH3 and MTFH7. The following relations are satisfied: MTFH0 is about 0.67, MTFH3 is about 0.58 and MTFH7 is about 0.28.

Please refer to the following Table 5 and Table 6.

The detailed data of the optical image capturing system of the third embodiment is as shown in Table 5.

TABLE 5

Data of the optical image capturing system
f = 4.572 mm; f/HEP = 1.6; HAF = 40.007 deg

| Surface # | | Curvature Radius | Thickness | Material | Index | Abbe # | Focal length |
|---|---|---|---|---|---|---|---|
| 0 | Object | Plano | At infinity | | | | |
| 1 | Ape. Stop | Plano | −0.028 | | | | |
| 2 | Lens 1 | 3.349506148 | 0.586 | Plastic | 1.565 | 54.50 | 4.839 |
| 3 | | −14.1944866 | 0.112 | | | | |
| 4 | Lens 2 | 3.513736031 | 0.230 | Plastic | 1.632 | 23.40 | −10.907 |
| 5 | | 2.273980151 | 0.792 | | | | |
| 6 | Lens 3 | −2.937749329 | 0.230 | Plastic | 1.632 | 23.40 | −10.294 |
| 7 | | −5.485288445 | 0.050 | | | | |
| 8 | Lens 4 | 8.951329782 | 0.598 | Plastic | 1.565 | 58.00 | 8.523 |
| 9 | | −10.24098253 | 0.122 | | | | |
| 10 | Lens 5 | −7.555047552 | 2.524 | Plastic | 1.565 | 58.00 | 2.559 |
| 11 | | −1.363895967 | 0.050 | | | | |
| 12 | Lens 6 | 3.712790699 | 0.825 | Plastic | 1.583 | 30.20 | −2.715 |
| 13 | | 1.022774784 | 1.000 | | | | |
| 14 | IR-bandstop filter | Plano | 0.200 | | 1.517 | 64.13 | |
| 15 | | Plano | 0.376 | | | | |
| 16 | Image plane | Plano | | | | | |

Reference wavelength (d-line) = 555 nm,
shield position:
clear aperture (CA) of the third piano = 1.45 mm.

As for the parameters of the aspheric surfaces of the third embodiment, reference is made to Table 6.

TABLE 6

| | Aspheric Coefficients | | | |
|---|---|---|---|---|
| Surface # | 2 | 3 | 4 | 5 |
| k | 1.081869E+00 | 5.000000E+01 | −2.237089E+01 | −9.387380E+00 |
| A4 | 4.039353E−03 | 3.159991E−02 | −1.401848E−03 | −1.160741E−02 |
| A6 | 6.769369E−04 | −1.045610E−02 | −5.797617E−03 | −4.928753E−03 |
| A8 | −7.540334E−04 | 2.526804E−03 | 4.742299E−04 | −1.070303E−03 |

TABLE 6-continued

| Aspheric Coefficients | | | | |
|---|---|---|---|---|
| A10 | 3.718752E−04 | 6.638899E−05 | 5.740184E−04 | 3.618635E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| Surface # | 6 | 7 | 8 | 9 |
| k | −6.242281E+00 | 4.540183E+00 | −5.000000E+01 | 2.145470E+01 |
| A4 | −3.090551E−03 | 3.461925E−02 | −2.428350E−02 | −3.214974E−02 |
| A6 | −6.399425E−03 | −4.887575E−04 | 5.012202E−03 | 1.288848E−03 |
| A8 | −3.618382E−03 | −1.159724E−04 | −4.243910E−04 | 6.045645E−04 |
| A10 | 8.294388E−05 | −7.675560E−05 | 9.955141E−06 | 1.602566E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| Surface # | 10 | 11 | 12 | 13 |
| k | 7.838327E+00 | −3.404911E+00 | −3.243002E+01 | −4.071112E+00 |
| A4 | −8.409155E−03 | −1.617007E−02 | −5.505504E−03 | −8.140907E−03 |
| A6 | −5.700005E−04 | 8.681852E−04 | −3.218603E−03 | 1.107330E−04 |
| A8 | 9.756202E−04 | 2.760201E−05 | 4.274671E−04 | 3.597533E−05 |
| A10 | 2.050466E−04 | −3.558195E−05 | −4.483038E−06 | −5.224011E−06 |
| A12 | −8.266640E−05 | 4.063189E−06 | −1.113874E−06 | 2.134032E−07 |
| A14 | 6.502298E−06 | −3.122875E−08 | 9.755300E−10 | −3.327530E−09 |

The presentation of the aspheric surface formula in the third embodiment is similar to that in the first embodiment. Besides, the definitions of parameters in following tables are equal to those in the first embodiment so the repetitious details will not be given here.

The following contents may be deduced from Table 5 and Table 6.

| Third embodiment (Primary reference wavelength: 555 mn) | | | | | |
|---|---|---|---|---|---|
| ETP1 | ETP2 | ETP3 | ETP4 | ETP5 | ETP6 |
| 0.227 | 0.267 | 0.563 | 0.352 | 2.118 | 1.220 |
| ETP1/TP1 | ETP2/TP2 | ETP3/TP3 | ETP4/TP4 | ETP5/TP5 | ETP6/TP6 |
| 0.387 | 1.160 | 2.447 | 0.588 | 0.839 | 1.479 |
| ETL | EBL | EIN | EIR | PIR | EIN/ETL |
| 7.332 | 1.061 | 6.271 | 0.485 | 1.000 | 0.855 |
| SETP/EIN | EIR/PIR | SETP | STP | SETP/STP | BL |
| 0.757 | 0.485 | 4.746 | 4.993 | 0.950 | 1.578 |
| ED12 | ED23 | ED34 | ED45 | ED56 | EBL/BL |
| 0.267 | 0.191 | 0.148 | 0.174 | 0.745 | 0.6724 |
| SED | SIN | SED/SIN | | | |
| 1.525 | 1.126 | 1.354 | | | |
| ED12/IN12 | ED23/IN23 | ED34/TN34 | ED45/IN45 | ED56/TN56 | |
| 2.386 | 0.241 | 2.964 | 1.426 | 14.894 | |
| \| f/f1 \| | \| f/f2 \| | \| f/f3 \| | \| f/f4 \| | \| f/f5 \| | \| f/f6 \| |
| 0.94482 | 0.41918 | 0.44414 | 0.53643 | 1.78664 | 1.68398 |
| ΣPPR | ΣNPR | ΣPPR/\|ΣNPR\| | IN12/f | IN56/f | TP4/(IN34 + TP4 + IN45) |
| 3.26789 | 2.54730 | 1.28288 | 0.02450 | 0.01094 | 0.77662 |
| \| f1/f2 \| | \| f2/f3 \| | (TP1 + IN12)/TP2 | | (TP6 + IN56)/TP5 | |
| 0.44366 | 1.05955 | 3.03478 | | 0.34667 | |
| HOS | InTL | HOS/HOI | InS/HOS | \| ODT \| % | \| TDT \| % |
| 7.69700 | 6.11900 | 1.96653 | 0.99636 | 2.05600 | 1.13300 |
| HVT51 | HVT52 | HVT61 | HVT62 | HVT62/HOI | HVT62/HOS |
| 2.068 | 0 | 1.49400 | 2.76300 | 0.70593 | 0.35897 |
| TP2/TP3 | TP3/TP4 | InRS61 | InRS62 | \| InRS61 \|/TP6 | \| InRS62 \|/TP6 |
| 1.00000 | 0.38462 | −0.52400 | 0.12100 | 0.63515 | 0.14667 |

The following contents may be deduced from Table 5 and Table 6.

| Related inflection point values of third embodiment (Primary reference wavelength: 555 nm) | | | | | | | |
|---|---|---|---|---|---|---|---|
| HIF121 | 0.5010 | HIF121/HOI | 0.1280 | SGI121 | −0.0070 | \|SGI121\|/(\|SGI121\| + TP1) | 0.0118 |
| HIF211 | 0.8630 | HIF211/HOI | 0.2205 | SGI211 | 0.0810 | \|SGI211\|/(\|SGI211\| + TP2) | 0.2605 |
| HIF212 | 1.2520 | HIF212/HOI | 0.3199 | SGI212 | 0.1350 | \|SGI212\|/(\|SGI212\| + TP2) | 0.3699 |
| HIF221 | 0.7900 | HIF221/HOI | 0.2018 | SGI221 | 0.1080 | \|SGI221\|/(\|SGI221\| + TP2) | 0.3195 |
| HIF321 | 0.7240 | HIF321/HOI | 0.1850 | SGI321 | −0.0400 | \|SGI321\|/(\|SGI321\| + TP3) | 0.1481 |

Related inflection point values of third embodiment (Primary reference wavelength: 555 nm)

| | | | | | | | |
|---|---|---|---|---|---|---|---|
| HIF322 | 1.6470 | HIF322/HOI | 0.4208 | SGI322 | −0.0620 | \|SGI322\|/(\|SGI322\| + TP3) | 0.2123 |
| HIF411 | 0.5880 | HIF411/HOI | 0.1502 | SGI411 | 0.0160 | \|SGI411\|/(\|SGI411\| + TP4) | 0.0261 |
| HIF421 | 1.5630 | HIF421/HOI | 0.3993 | SGI421 | −0.2790 | \|SGI421\|/(\|SGI421\| + TP4) | 0.3181 |
| HIF511 | 1.4540 | HIF511/HOI | 0.3715 | SGI511 | −0.1750 | \|SGI511\|/(\|SGI511\| + TP5) | 0.0648 |
| HIF521 | 2.4900 | HIF521/HOI | 0.6362 | SGI521 | −1.6160 | \|SGI521\|/(\|SGI521\| + TP5) | 0.4966 |
| HIF611 | 0.7860 | HIF611/HOI | 0.2008 | SGI611 | 0.0620 | \|SGI611\|/(\|SGI611\| + TP6) | 0.0699 |
| HIF621 | 1.0750 | HIF621/HOI | 0.2747 | SGI621 | 0.3540 | \|SGI621\|/(\|SGI621\| + TP6) | 0.3003 |

The Fourth Embodiment (Embodiment 4)

Figure 4A:
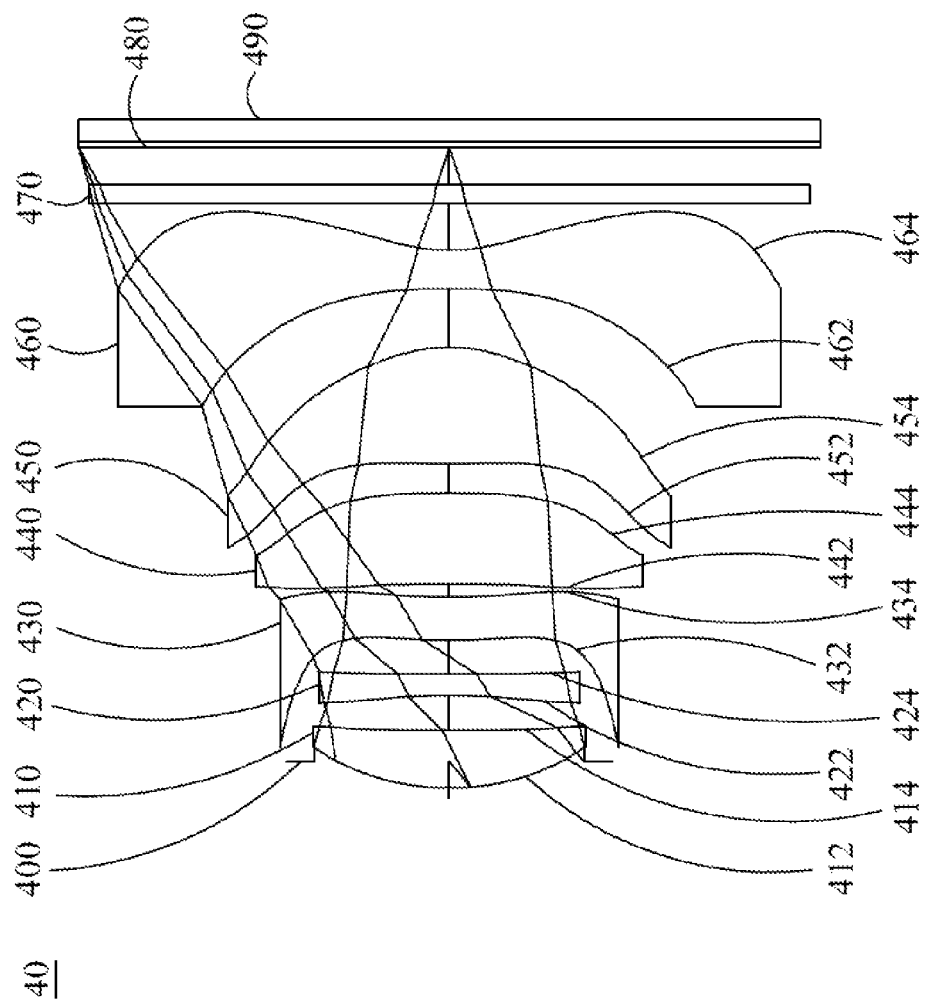
FIG. 4A is a schematic view of the optical image capturing system according to the fourth embodiment of the present application.
Figure 4B:
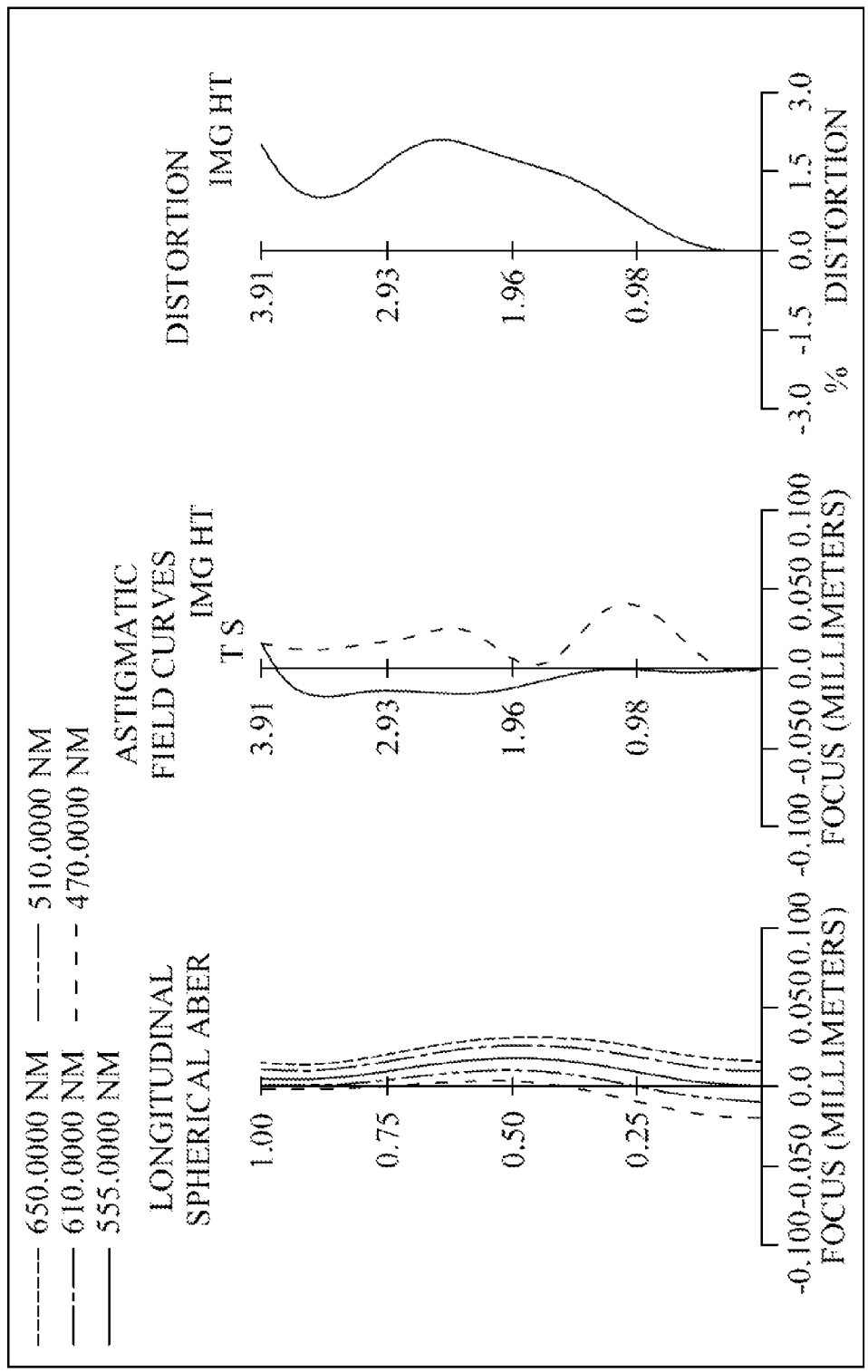
FIG. 4B is longitudinal spherical aberration curves, astigmatic field curves, and an optical distortion grid of the optical image capturing system in the order from left to right according to the fourth embodiment of the present application.
Figure 4C:
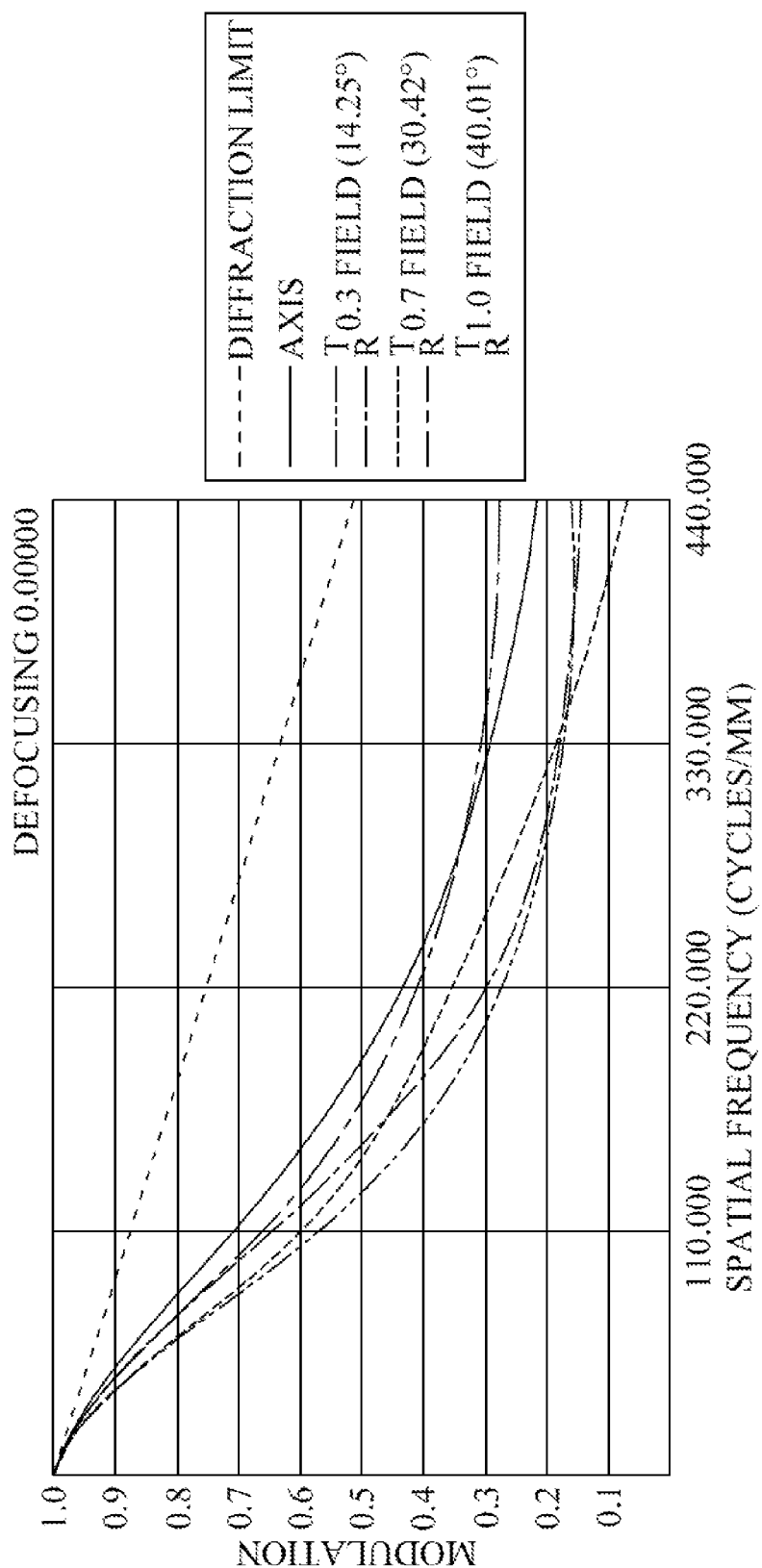
FIG. 4C is a characteristic diagram of modulation transfer according to the fourth embodiment of the present application.

Please refer to FIG. 4A, FIG. 4B and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a characteristic diagram of modulation transfer according to the fourth embodiment of the present application. As shown in FIG. 4A, in order from an object side to an image side, the optical image capturing system includes an aperture stop 400, a first lens element 410, a second lens element 420, a third lens element 430, a fourth lens element 440, a fifth lens element 450, a sixth lens element 460, an IR-bandstop filter 480, an image plane 490, and an image sensing device 492.

The first lens element 410 has positive refractive power and it is made of plastic material. The first lens element 410 has a convex object-side surface 412 and a concave image-side surface 414, both of the object-side surface 412 and the image-side surface 414 are aspheric.

The second lens element 420 has negative refractive power and it is made of plastic material. The second lens element 420 has a concave object-side surface 422 and a convex image-side surface 424, both of the object-side surface 422 and the image-side surface 424 are aspheric. The object-side surface 422 has an inflection point and the image-side surface 424 has two inflection points.

The third lens element 430 has positive refractive power and it is made of plastic material. The third lens element 430 has a convex object-side surface 432 and a concave image-side surface 434, both of the object-side surface 432 and the image-side surface 434 are aspheric. The object-side surface 432 has an inflection point and the image-side surface 434 has two inflection points.

The fourth lens element 440 has positive refractive power and it is made of plastic material. The fourth lens element 440 has a concave object-side surface 442 and a convex image-side surface 444, both of the object-side surface 442 and the image-side surface 444 are aspheric, and the object-side surface 442 and the image-side surface 444 have an inflection point respectively.

The fifth lens element 450 has positive refractive power and it is made of plastic material. The fifth lens element 450 has a convex object-side surface 452 and a convex image-side surface 454, both of the object-side surface 452 and the image-side surface 454 are aspheric, and the object-side surface 452 has two inflection points and the image-side surface 454 has an inflection point.

The sixth lens element 460 has negative refractive power and it is made of plastic material. The sixth lens element 460 has a concave object-side surface 462 and a concave image-side surface 464. Hereby, the back focal length is reduced to miniaturize the lens element effectively. In addition, the image-side surface 464 has an inflection point. Thus, the angle of incident with incoming light from an off-axis view field can be suppressed effectively and the aberration in the off-axis view field can be corrected further.

The IR-bandstop filter 480 is made of glass material without affecting the focal length of the optical image capturing system and it is disposed between the sixth lens element 460 and the image plane 490.

In the optical image capturing system of the fourth embodiment, focal lengths of the second lens element 420 through the sixth lens element 460 are f2, f3, f4, f5 and f6 respectively. The following relations are satisfied: |f2|+|f3|+|f4|+|f5|=119.927 mm. |f1|+|f6|=7.674 mm and |f2|+|f3|+|f4|+|f5|>|f1|+|f6|.

In the optical image capturing system of the fourth embodiment, focal lengths of the first lens element 410, the third lens element 430, the fourth lens element 440 and the fifth lens element 450 are f1, f3, f4 and f5, respectively. A sum of focal lengths of all lens elements with positive refractive power is ΣPP. The following relation is satisfied: ΣPP=f1+f3+f4+f5=115.50500 mm and f1/(f1+f3+f4+f5)= 0.04418. Hereby, it is favorable for allocating the positive refractive power of the first lens element 410 to other positive lens elements and the significant aberrations generated in the process of moving the incident light can be suppressed.

In the optical image capturing system of the fourth embodiment, focal lengths of the second lens element 420 and the sixth lens element 460 are f2 and f6, respectively. A sum of focal lengths of all lens elements with negative refractive power is ΣNP. The following relation is satisfied: ΣNP=f2+f6=−12.09600 mm and f6/(f2+f6)=0.21255. Hereby, it is favorable for allocating the negative refractive power of the sixth lens element 460 to other negative lens elements.

In the optical image capturing system of the present embodiment, contrast transfer rates of modulation transfer with half frequencies (MTF values) at the optical axis on the image plane, 0.3 HOI and 0.7 HOI are respectively denoted by MTFH0, MTFH3 and MTFH7. The following relations are satisfied: MTFH0 is about 0.44, MTFH3 is about 0.27 and MTFH7 is about 0.35.

Please refer to the following Table 7 and Table 8.

The detailed data of the optical image capturing system of the fourth embodiment is as shown in Table 7.

TABLE 7

Data of the optical image capturing system
f = 4.566 mm; f/HEP = 1.6; HAF = 40.008 deg

| Surface # | | Curvature Radius | Thickness | Material | Index | Abbe # | Focal length |
|---|---|---|---|---|---|---|---|
| 0 | Object | Plano | At infinity | | | | |
| 1 | Shading sheet | Plano | 0.000 | | | | |
| 2 | Ape. Stop | Plano | −0.279 | | | | |
| 3 | Lens 1 | 2.698081453 | 0.616 | Plastic | 1.565 | 58.00 | 5.103 |
| 4 | | 36.82124997 | 0.375 | | | | |
| 5 | Lens 2 | −5.599970494 | 0.230 | Plastic | 1.607 | 26.60 | −9.525 |
| 6 | | −149.7883556 | 0.368 | | | | |
| 7 | Lens 3 | 5.752465942 | 0.464 | Plastic | 1.650 | 21.40 | 68.468 |
| 8 | | 6.387741751 | 0.139 | | | | |
| 9 | Lens 4 | −23.32994927 | 0.976 | Plastic | 1.565 | 58.00 | 39.027 |
| 10 | | −11.52618887 | 0.314 | | | | |
| 11 | Lens 5 | 49.71647639 | 1.252 | Plastic | 1.565 | 58.00 | 2.907 |
| 12 | | −1.688505823 | 0.625 | | | | |
| 13 | Lens 6 | −9.822830406 | 0.422 | Plastic | 1.583 | 30.20 | −2.571 |
| 14 | | 1.808263704 | 0.500 | | | | |
| 15 | IR-bandstop filter | Plano | 0.200 | | 1.517 | 64.13 | |
| 16 | | Plano | 0.401 | | | | |
| 17 | Image plane | Plano | | | | | |

Reference wavelength (d-line) = 555 nm,
shield position:
clear aperture (CA) of the first plano = 1.38 mm;
shield position:
clear aperture (CA) of the fifth plano = 1.24 mm.

As for the parameters of the aspheric surfaces of the fourth embodiment, reference is made to Table 8.

TABLE 8

Aspheric Coefficients

| Surface # | 3 | 4 | 5 | 6 |
|---|---|---|---|---|
| k | 2.680001E−01 | −1.848417E+01 | −2.089660E+01 | −5.000000E+01 |
| A4 | 1.316584E−03 | 5.502135E−03 | 2.826502E−02 | 2.225720E−02 |
| A6 | 1.654305E−03 | 1.030648E−03 | −7.995208E−03 | −7.843901E−03 |
| A8 | −4.406612E−04 | −7.004800E−04 | −5.262944E−04 | −2.150821E−04 |
| A10 | 2.852399E−04 | 2.565656E−04 | 7.337410E−04 | 1.112020E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |

| Surface # | 7 | 8 | 9 | 10 |
|---|---|---|---|---|
| k | −2.534165E−01 | −6.878887E+00 | 5.000000E+01 | 2.169366E+01 |
| A4 | −5.675412E−02 | −1.7827.20E−02 | 1.397688E−03 | −2.694632E−02 |
| A6 | −5.032857E−03 | −5.140508E−03 | −1.205056E−03 | −4.862460E−03 |
| A8 | −2.681002E−03 | −3.918157E−05 | 3.299426E−04 | −1.368707E−04 |
| A10 | −1.300290E−03 | 3.014709E−04 | 5.151536E−05 | 3.369471E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |

| Surface # | 11 | 12 | 13 | 14 |
|---|---|---|---|---|
| k | 1.778288E+01 | −2.821013E+00 | 3.538467E+00 | −5.692642E+00 |
| A4 | −3.454460E−02 | −6.866895E−03 | −3.588595E−02 | −2.557653E−02 |
| A6 | 4.257124E−03 | −3.119914E−03 | 4.630364E−03 | 4.670552E−03 |
| A8 | −4.341389E−03 | −9.804925E−05 | −5.355993E−05 | −4.786285E−04 |
| A10 | −1.393984E−04 | −2.160941E−05 | −5.729928E−05 | 1.246726E−05 |
| A12 | 3.646512E−04 | 1.529787E−06 | 3.892946E−06 | 7.337188E−07 |
| A14 | −3.978753E−05 | 2.078856E−06 | −1.722633E−07 | −3.84.3737E−08 |

The presentation of the aspheric surface formula in the fourth embodiment is similar to that in the first embodiment. Besides the definitions of parameters in following tables are equal to those in the first embodiment so the repetitious details will not be given here.

The following contents may be deduced from Table 7 and Table 8.

element 560, an IR-bandstop filter 580, an image plane 590, and an Image sensing device 592.

The first lens element 510 has positive refractive power and it is made of plastic material. The first lens element 510 has a convex object-side surface 512 and a concave image-side surface 514, both of the object-side surface 512 and the image-side surface 514 are aspheric.

| Fourth embodiment (Primary reference wavelength: 555 nm) | | | | | |
|---|---|---|---|---|---|
| ETP1 | ETP2 | ETP3 | ETP4 | ETP5 | ETP6 |
| 0.260 | 0.328 | 0.652 | 0.801 | 0.874 | 0.914 |
| ETP1/TP1 | ETP2/TP2 | ETP3/TP3 | ETP4/TP4 | ETP5/TP5 | ETP6/TP6 |
| 0.422 | 1.427 | 1.406 | 0.821 | 0.698 | 2.165 |
| ETL | EBL | EIN | EIR | PIR | EIN/ETL |
| 6.476 | 0.809 | 5.667 | 0.207 | 0.500 | 0.875 |
| SETP/EIN | EIR/PIR | SETP | STP | SETP/STP | BL |
| 0.676 | 0.415 | 3.830 | 3.960 | 0.967 | 1.102 |
| ED12 | ED23 | ED34 | ED45 | ED56 | EBL/BL |
| 0.247 | 0.207 | 0.052 | 0.406 | 0.926 | 0.7341 |
| SED | SIN | SED/SIN | | | |
| 1.837 | 1.820 | 1.009 | | | |
| ED12/IN12 | ED23/IN23 | ED34/IN34 | ED45/TN45 | ED56/IN56 | |
| 0.659 | 0.562 | 0.372 | 1.293 | 1.483 | |
| \| f/f1 \| | \| f/f2 \| | \| f/f3 \| | \| f/f4 \| | \| f/f5 \| | \| f/f6 \| |
| 0.89477 | 0.47937 | 0.06669 | 0.11700 | 1.57069 | 1.77596 |
| ΣPPR | ΣNPR | ΣPPR/\|ΣNPR\| | IN12/f | IN56/f | TP4/(IN34 + TP4 + IN45) |
| 2.64914 | 2.25533 | 1.17461 | 0.08213 | 0.13688 | 0.68300 |
| \| f1/f2 \| | \| f2/f3 \| | (TP1 + IN12)/TP2 | | (TP6 + IN56)/TP5 | |
| 0.53575 | 0.13912 | 4.30870 | | 0.83626 | |
| HOS | InTL | HOS/HOI | InS/HOS | \| ODT \| % | \| TDT \| % |
| 6.88200 | 5.78000 | 1.75830 | 0.95946 | 2.09500 | 1.09900 |
| HVT51 | HVT52 | HVT61 | HVT62 | HVT62/HOI | HVT62/HOS |
| 0.386 | 0 | 0.00000 | 2.24000 | 0.57230 | 0.32549 |
| TP2/TP3 | TP3/TP4 | InRS61 | InRS62 | \| InRS61 \|/TP6 | \| InRS62 \|/TP6 |
| 0.49569 | 0.47541 | −1.25000 | −0.40900 | 2.96209 | 0.96919 |

The following contents may be deduced from Table 7 and Table 8.

The second lens element 520 has positive refractive power and it is made of plastic material. The second lens

| Related inflection point values of fourth embodiment (Primary reference wavelength: 555 nm) | | | | | | | |
|---|---|---|---|---|---|---|---|
| HIF211 | 0.7370 | HIF211/HOI | 0.1883 | SGI211 | −0.0380 | \|SGI211\|/(\|SGI211\| + TP2) | 0.1418 |
| HIF221 | 0.1600 | HIF221/HOI | 0.0409 | SGI221 | 0.0000 | \|SGI221\|/(\|SGI221\| + TP2) | 0.0000 |
| HIF222 | 1.0510 | HIF222/HOI | 0.2685 | SGI222 | 0.0130 | \|SGI222\|/(\|SGI222\| + TP2) | 0.0535 |
| HIF311 | 0.4910 | HIF311/HOI | 0.1254 | SGI311 | 0.0180 | \|SGI311\|/(\|SGI311\| + TP3) | 0.0373 |
| HIF321 | 0.7010 | HIF321/HOI | 0.1791 | SGI321 | 0.0330 | \|SGI321\|/(\|SGI321\| + TP3) | 0.0664 |
| HIF322 | 1.6950 | HIF322/HOI | 0.4331 | SGI322 | −0.0070 | \|SGI322\|/(\|SGI322\| + TP3) | 0.0149 |
| HIF411 | 1.3100 | HIF411/HOI | 0.3347 | SGI411 | −0.0370 | \|SGI411\|/(\|SGI411\| + TP4) | 0.0365 |
| HIF421 | 1.7740 | HIF421/HOI | 0.4532 | SGI421 | −0.4910 | \|SGI421\|/(\|SGI421\| + TP4) | 0.3347 |
| HIF511 | 0.2220 | HIF511/HOI | 0.0567 | SGI511 | 0.0000 | \|SGI511\|/(\|SGI511\| + TP5) | 0.0000 |
| HIF512 | 1.8900 | HIF512/HOI | 0.4829 | SGI512 | −0.5360 | \|SGI512\|/(\|SGI512\| + TP5) | 0.2998 |
| HIF521 | 2.1320 | HIF521/HOI | 0.5447 | SGI521 | −1.3270 | \|SGI521\|/(\|SGI521\| + TP5) | 0.5145 |
| HIF621 | 0.9060 | HIF621/HOI | 0.2315 | SGI621 | 0.1690 | \|SGI621\|/(\|SGI621\| + TP6) | 0.2860 |

The Fifth Embodiment (Embodiment 5)

Figure 5A:
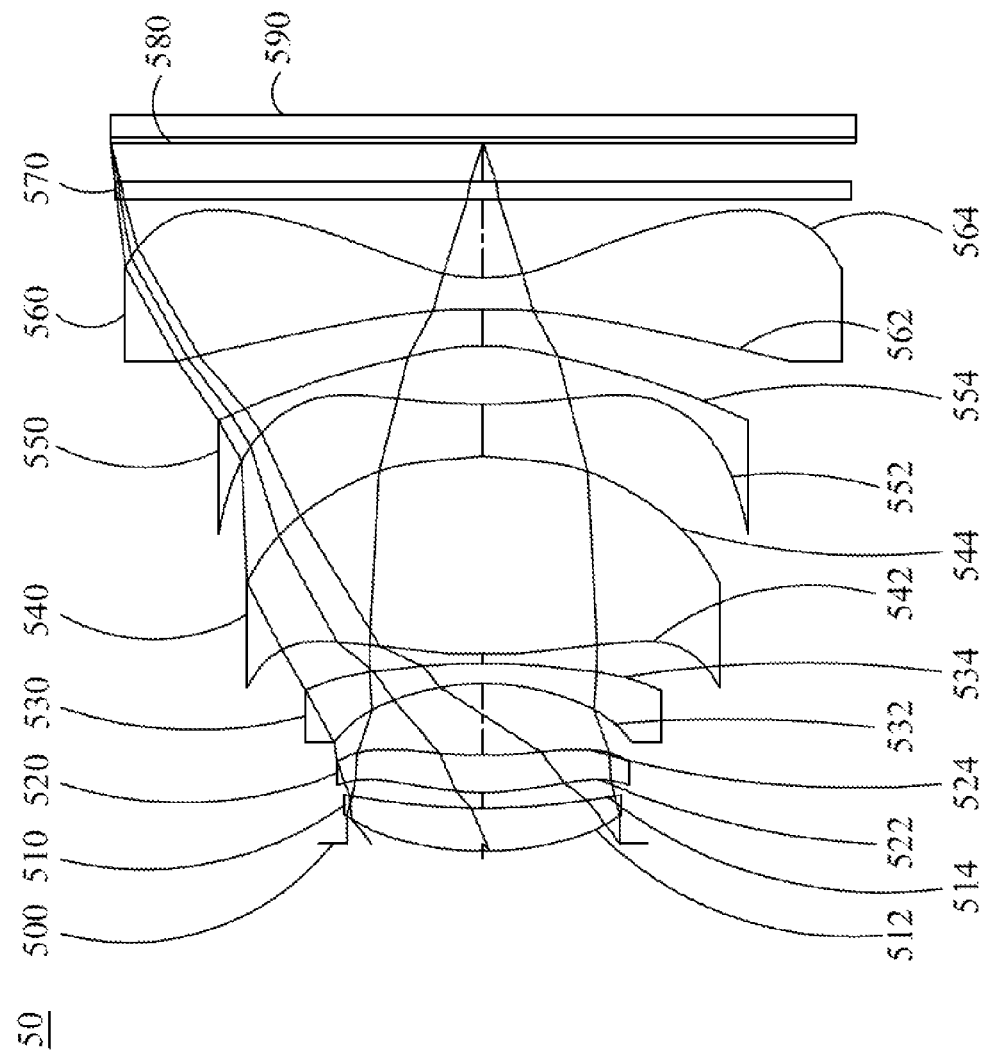
FIG. 5A is a schematic view of the optical image capturing system according to the fifth embodiment of the present application.
Figure 5B:
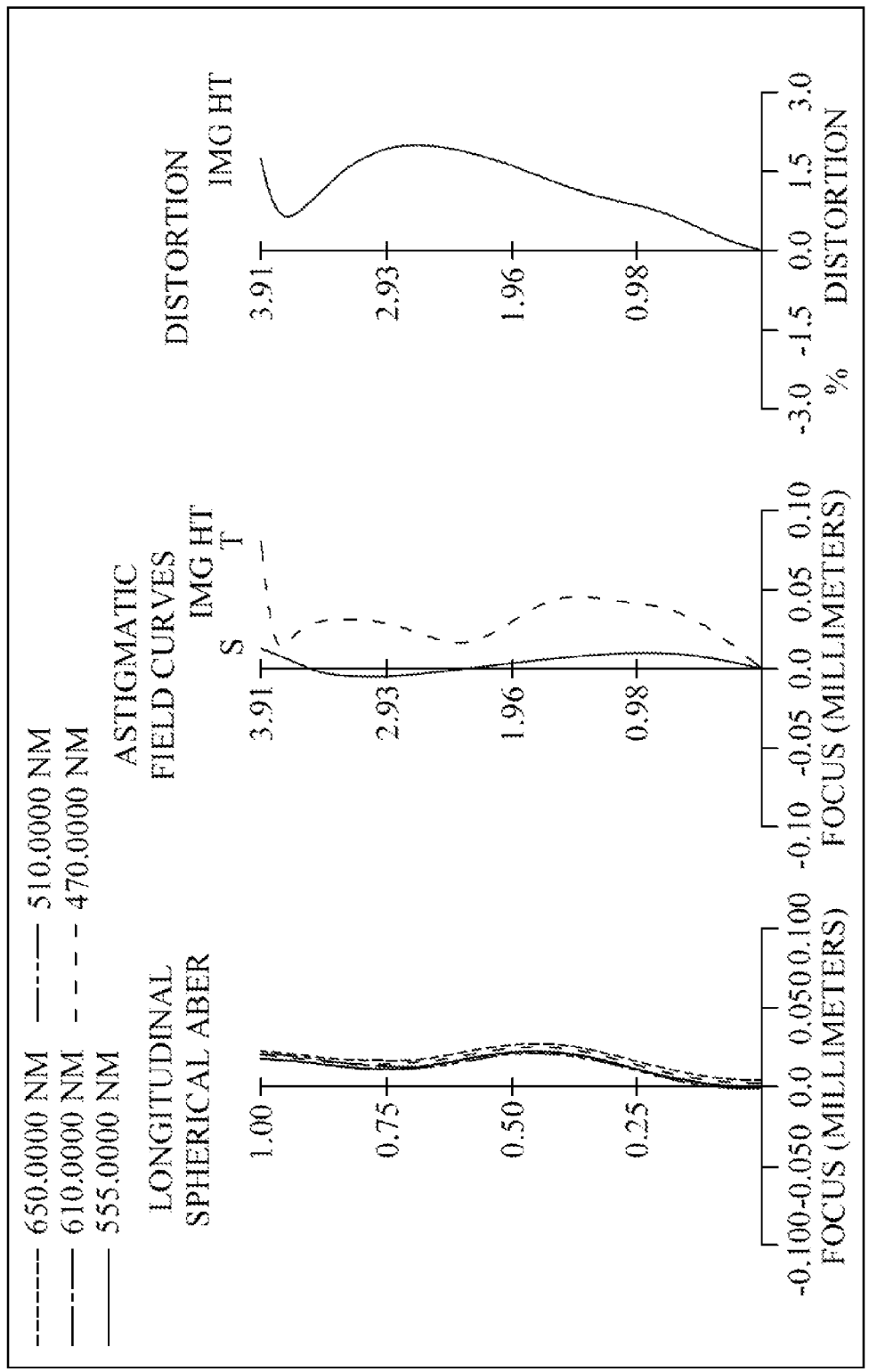
FIG. 5B is longitudinal spherical aberration curves, astigmatic field curves, and an optical distortion grid of the optical image capturing system in the order from left to right according to the fifth embodiment of the present application.
Figure 5C:
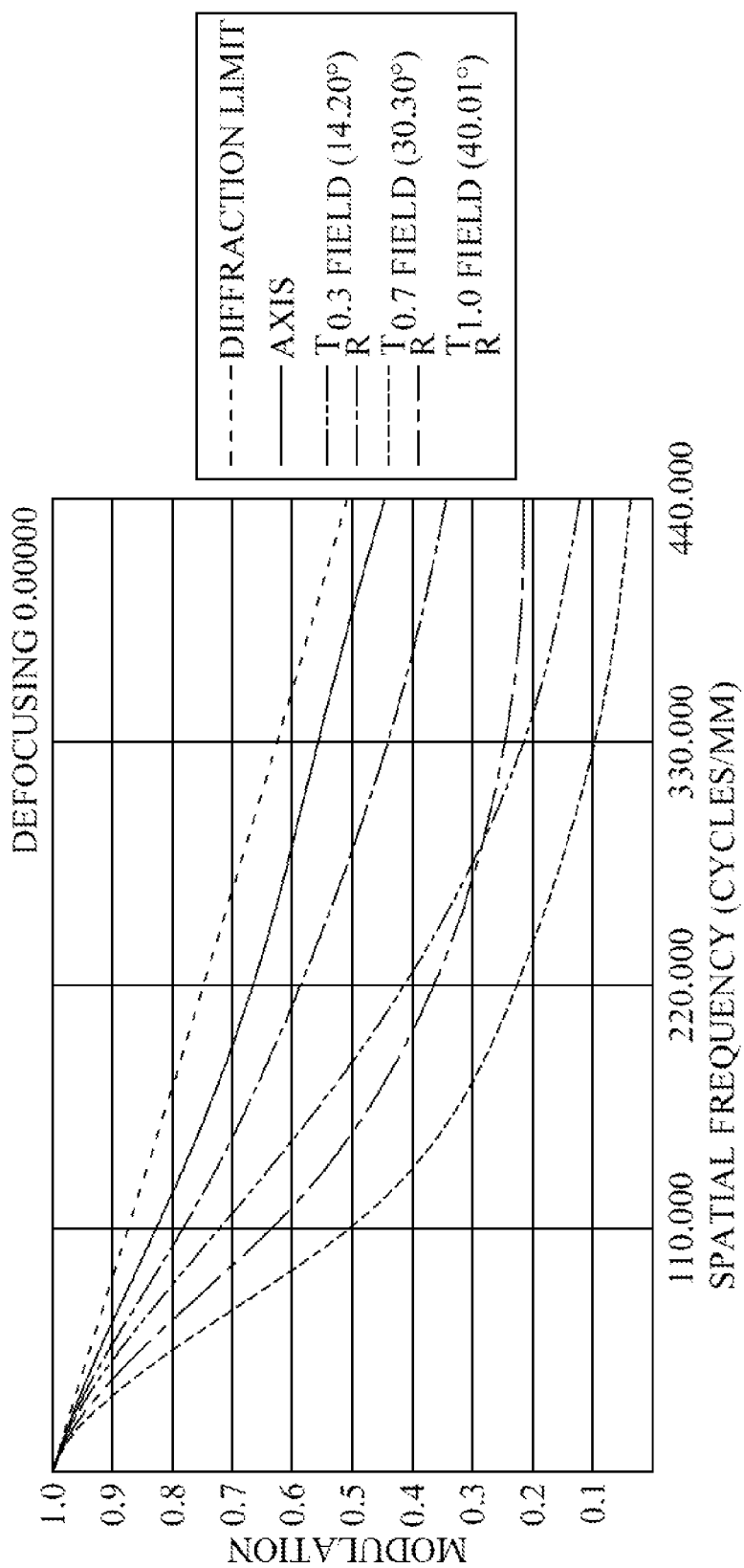
FIG. 5C is a characteristic diagram of modulation transfer according to the fifth embodiment of the present application.

Please refer to FIG. 5A, FIG. 5B and FIG. 5C, FIG. 5A is a schematic view of the optical image capturing system according to the fifths embodiment of the present application, FIG. 5B is longitudinal spherical aberration curves, astigmatic field curves, and an optical distortion curve of the optical image capturing system in the order from left to right according to the filth embodiment of the present application, and FIG. 5C is a characteristic diagram of modulation transfer according to the fifth embodiment of the present application. As shown in FIG. 5A, in order from an object side to an image side, the optical image capturing system includes an aperture stop 500, a first lens element 510, a second lens element 520, a third lens element 530, a fourth lens element 540, a fifth lens element 550, a sixth lens element 520 has a convex object-side surface 522 and a concave image-side surface 524, both of the object-side surface 522 and the image-side surface 524 are aspheric. The object-side surface 522 and the image-side surface 524 have an inflection point respectively.

The third lens element 530 has negative refractive power and it is made of plastic material. The third lens element 530 has a concave object-side surface 532 and a convex image-side surface 534, and both of the object-side surface 532 and the image-side surface 534 are aspheric.

The fourth lens element 540 has positive refractive power and it is made of plastic material. The fourth lens element 540 has a convex object-side surface 542 and a convex image-side surface 544, both of the object-side surface 542 and the image-side surface 544 are aspheric. The object-side surface 542 has an inflection point.

The fifth lens element 550 has positive refractive power and it is made of plastic material. The fifth lens element 550 has a convex object-side surface 552 and a convex image-side surface 554, both of the object-side surface 552 and the image-side surface 554 are aspheric, and the object-side surface 552 and the image-side surface 554 have an inflection point respectively.

The sixth lens element 560 has negative refractive power and it is made of plastic material. The sixth lens element 560 has a concave object-side surface 562 and a concave image-side surface 564. Hereby, the back focal length is reduced to miniaturize the lens element effectively. In addition, the object-side surface 562 has two inflection points and the image-side surface 564 has an inflection point. Thus, the angle of incident with incoming light from an off-axis view field can be suppressed effectively and the aberration in the off-axis view field can be corrected further.

The IR-bandstop filter 580 is made of glass material without affecting the focal length of the optical image capturing system and it is disposed between the sixth lens element 560 and the image plane 590.

In the optical image capturing system of the fifth embodiment, focal lengths of the second lens element 520 through the sixth lens element 560 are f2, f3, f4, f5 and f6 respectively. The following relations are satisfied: |f2|+|f3|+|f4|+|f5|=24.86 mm. |f1|+|f6|=22.917 mm and |f2|+|f3|+|f4|+|f5|>|f1|+|f6|.

In the optical image capturing system of the fifth embodiment, focal lengths of the first lens element 510, the second lens element 520, the fourth lens element 540 and the fifth lens element 550 are f1, f2, f4 and f5, respectively. A sum of focal lengths of all lens elements with positive refractive power is ΣPP. The following relation is satisfied: ΣPP=f1+f2+f4+f5=39.36200 mm and f1/(f1+f2+f4+f5)=0.52604. Hereby, it is favorable for allocating the positive refractive power of the first lens element 510 to other positive lens elements and the significant aberrations generated in the process of moving the incident light can be suppressed.

In the optical image capturing system of the fifth embodiment, focal lengths of the third lens element 530 and the sixth lens element 560 are f3 and f6, respectively. A sum of focal lengths of all lens elements with negative refractive power is ΣNP. The following relation is satisfied: ΣNP=f3+f6=−8.41500 mm and f6/(f3+f6)=0.26275. Hereby, it is favorable for allocating the negative refractive power of the sixth lens element 560 to other negative lens elements.

In the optical image capturing system of the present embodiment, contrast transfer rates of modulation transfer with half frequencies (MTF values) at the optical axis on the image plane, 0.3 HOI and 0.7 HOI are respectively denoted by MTFH0, MTFH3 and MTFH7. The following relations are satisfied: MTFH0 is about 0.67, MTFH3 is about 0.42 and MTFH7 is about 0.23.

Please refer to the following Table 9 and Table 10.

The detailed data of the optical image capturing system of the fifth embodiment is as shown in Table 9.

TABLE 9

Data of the optical image capturing system
f = 4.581 mm; f/HEP = 1.6; HAF = 40.010 deg

| Surface # | Curvature Radius | | Thickness | Material | Index | Abbe # | Focal length |
|---|---|---|---|---|---|---|---|
| 0 | Object | Plano | At infinity | | | | |
| 1 | Ape. Stop | Plano | −0.081 | | | | |
| 2 | Lens 1 | 3.499376378 | 0.444 | Plastic | 1.565 | 58.00 | 20.706 |
| 3 | | 4.757120049 | 0.168 | | | | |
| 4 | Lens 2 | 2.623658793 | 0.382 | Plastic | 1.565 | 58.00 | 10.670 |
| 5 | | 4.389772121 | 0.745 | | | | |
| 6 | Lens 3 | −2.564491183 | 0.200 | Plastic | 1.650 | 21.40 | −6.204 |
| 7 | | −7.158178111 | 0.109 | | | | |
| 8 | Lens 4 | 5.473933456 | 2.037 | Plastic | 1.565 | 58.00 | 5.184 |
| 9 | | −5.489489464 | 0.552 | | | | |
| 10 | Lens 5 | 4.901329793 | 0.600 | Plastic | 1.565 | 58.00 | 2.802 |
| 11 | | −2.2449013 | 0.387 | | | | |
| 17 | Lens 6 | −6.445227323 | 0.329 | Plastic | 1.565 | 54.50 | −2.211 |
| 13 | | 1.584949414 | 0.800 | | | | |
| 14 | IR-bandstop filter | Plano | 0.200 | | 1.517 | 64.13 | |
| 15 | | Plano | 0.383 | | | | |
| 16 | Image plane | Plano | 0.017 | | | | |

Reference wavelength (d-line) = 555 nm

As for the parameters of the aspheric surfaces of the fifth embodiment, reference is made to Table 10.

TABLE 10

Aspheric Coefficients

| Surface # | 2 | 3 | 4 | 5 |
|---|---|---|---|---|
| k | −9.113506E+00 | −4.761575E+01 | −1.008016E+01 | −1.779355E+00 |
| A4 | 2.484823E−02 | −1.352229E−02 | −2.715606E−02 | −4.099484E−02 |
| A6 | 1.785829E−03 | 1.017461E−02 | −1.057994E−02 | −1.426677E−02 |
| A8 | −2.121721E−03 | −4.104217E−03 | 1.706788E−03 | 3.130747E−03 |
| A10 | 9.888503E−04 | 1.292678E−03 | 1.053590E−04 | −1.899803E−04 |
| A12 | 0.000000E+00 | 0.000000E+00 | 0.000000E+00 | 0.000000E+00 |

TABLE 10-continued

| Aspheric Coefficients | | | | |
|---|---|---|---|---|
| A14 | 0.000000E+00 | 0.000000E+00 | 0.000000E+00 | 0.000000E+00 |
| Surface # | 6 | 7 | 8 | 9 |
| k | 1.374078E+00 | 4.1944.20E+00 | −4.878171E+01 | 2.437829E+00 |
| A4 | 2.918247E−02 | 4.107079E−03 | −1.593733E−03 | −2.399365E−02 |
| A6 | −1.140996E−02 | 8.473168E−04 | −8.583683E−04 | 1.512214E−03 |
| A8 | 3.955878E−04 | −3.695770E−04 | 1.140457E−04 | 2.334632E−04 |
| A10 | 6.913888E−04 | −8.118599E−05 | −6.095099E−05 | −4.269855E−05 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| Surface # | 10 | 11 | 12 | 13 |
| k | −4.851063E+00 | −9.407283E+00 | 2.671189E−01 | −5.024431E+00 |
| A4 | −2.030353E−02 | 4.673111E−03 | 8.915345E−04 | −7.749425E−03 |
| A6 | −1.180703E−03 | −4.890927E−04 | 4.430363E−04 | 3.203477E−04 |
| A8 | 7.928203E−05 | −5.233743E−05 | −4.885985E−06 | 5.861416E−06 |
| A10 | 4.696090E−06 | −3.636500E−06 | −1.037807E−06 | −1.875554E−06 |
| A12 | −1.521401E−06 | 1.194311E−07 | −2.606960E−09 | −2.203880E−08 |
| A14 | −1.926620E−07 | 9.812453E−08 | −5.744740E−09 | 2.003870E−09 |

The presentation of the aspheric surface formula in the fifth embodiment is similar to that in the first embodiment. Besides the definitions of parameters in following tables are equal to those in the first embodiment so the repetitious details will not be given here.

The following contents may be deduced from Table 9 and Table 10.

| Fifth embodiment (Primary reference wavelength: 555 nm) | | | | | |
|---|---|---|---|---|---|
| ETP1 | ETP2 | ETP3 | ETP4 | ETP5 | ETP6 |
| 0.232 | 0.269 | 0.536 | 1.644 | 0.220 | 0.874 |
| ETP1/TP1 | ETP2/TP2 | ETP3/TP3 | ETP4/TP4 | ETP5/TP5 | ETP6/TP6 |
| 0.521 | 0.703 | 2.682 | 0.807 | 0.366 | 2.660 |
| ETL | EBL | EIN | EIR | PIR | EIN/ETL |
| 7.003 | 1.008 | 5.995 | 0.409 | 0.800 | 0.856 |
| SETP/EIN | EIR/PIR | SETP | STP | SETP/STP | BL |
| 0.630 | 0.511 | 3.776 | 3.992 | 0.946 | 1.399 |
| ED12 | ED23 | ED34 | ED45 | ED56 | EBL/BL |
| 0.127 | 0.290 | 0.353 | 0.937 | 0.513 | 0.7205 |
| SED | SIN | SED/SIN | | | |
| 2.220 | 1.960 | 1.132 | | | |
| ED12/IN12 | ED23/IN23 | ED34/IN34 | ED45/IN45 | ED56/IN56 | |
| 0.760 | 0.389 | 3.245 | 1.696 | 1.325 | |
| \| f/f1 \| | \| f/f2 \| | \| f/f3 \| | \| f/f4 \| | \| f/f5 \| | \| f/f6 \| |
| 0.22124 | 0.42933 | 0.73839 | 0.88368 | 1.63490 | 2.07191 |
| ΣPPR | ΣNPR | ΣPPR/\|ΣNPR\| | IN12/f | IN56/f | TP4/(IN34 + TP4 + IN45) |
| 3.16916 | 2.81031 | 1.12769 | 0.03667 | 0.08448 | 0.75500 |
| \| f1/f2 \| | \| f2/f3 \| | (TP1 + IN12)/TP2 | | (TP6 + IN56)/TP5 | |
| 1.94058 | 1.71986 | 1.60209 | | 1.19333 | |
| HOS | InTL | HOS/HOI | InS/HOS | \| ODT \| % | \| TDT \| % |
| 7.35200 | 5.95300 | 1.87839 | 0.98898 | 2.00000 | 1.35200 |
| HVT51 | HVT52 | HVT61 | HVT62 | HVT62/HOI | HVT62/HOS |
| 1.388 | 0 | 0.00000 | 2.78600 | 0.71180 | 0.37894 |
| TP2/TP3 | TP3/TP4 | InRs61 | InRS62 | \| InRS61 \|/TP6 | \| InRS62 \|/TP6 |
| 1.91000 | 0.09818 | −0.53900 | 0.11600 | 1.63830 | 0.35258 |

The following contents may be deduced from Table 9 and Table 10.

| Related inflection point values of fifth embodiment (Primary reference wavelength: 555 nm) | | | | | | |
|---|---|---|---|---|---|---|
| HIF211 | 0.65900 | HIF211/HOI | 0.16837 | SGI211 | 0.06800 | \|SGI211\|/(\|SGI211\| + TP2) 0.15111 |
| HIF221 | 0.59800 | HIF221/HOI | 0.15278 | SGI221 | 0.03500 | \|SGI221\|/(\|SGI221\| + TP2) 0.08393 |
| HIF411 | 0.99900 | HIF411/HOI | 0.25524 | SGI411 | 0.06700 | \|SGI411\|/(\|SGI411\| + TP4) 0.03184 |
| HIF511 | 0.81400 | HIF511/HOI | 0.20797 | SGI511 | 0.05700 | \|SGI511\|/(\|SGI511\| + TP5) 0.08676 |
| HIF521 | 2.59000 | HIF521/HOI | 0.66173 | SGI521 | −0.68700 | \|SGI521\|/(\|SGI521\| + TP5) 0.53380 |

-continued

Related inflection point values of fifth embodiment (Primary reference wavelength: 555 nm)

| HIF611 | 1.91700 | HIF611/HOI | 0.48978 | SGI611 | −0.26100 | \|SGI611\|/(\|SGI611\| + TP6) | 0.44237 |
| HIF612 | 2.73100 | HIF612/HOI | 0.69775 | SGI612 | −0.42900 | \|SGI612\|/(\|SGI612\| + TP6) | 0.56596 |
| HIF621 | 1.17400 | HIF621/HOI | 0.29995 | SGI621 | 0.29800 | \|SGI621\|/(\|SGI621\| + TP6) | 0.47528 |

The Sixth Embodiment (Embodiment 6)

Figure 6A:
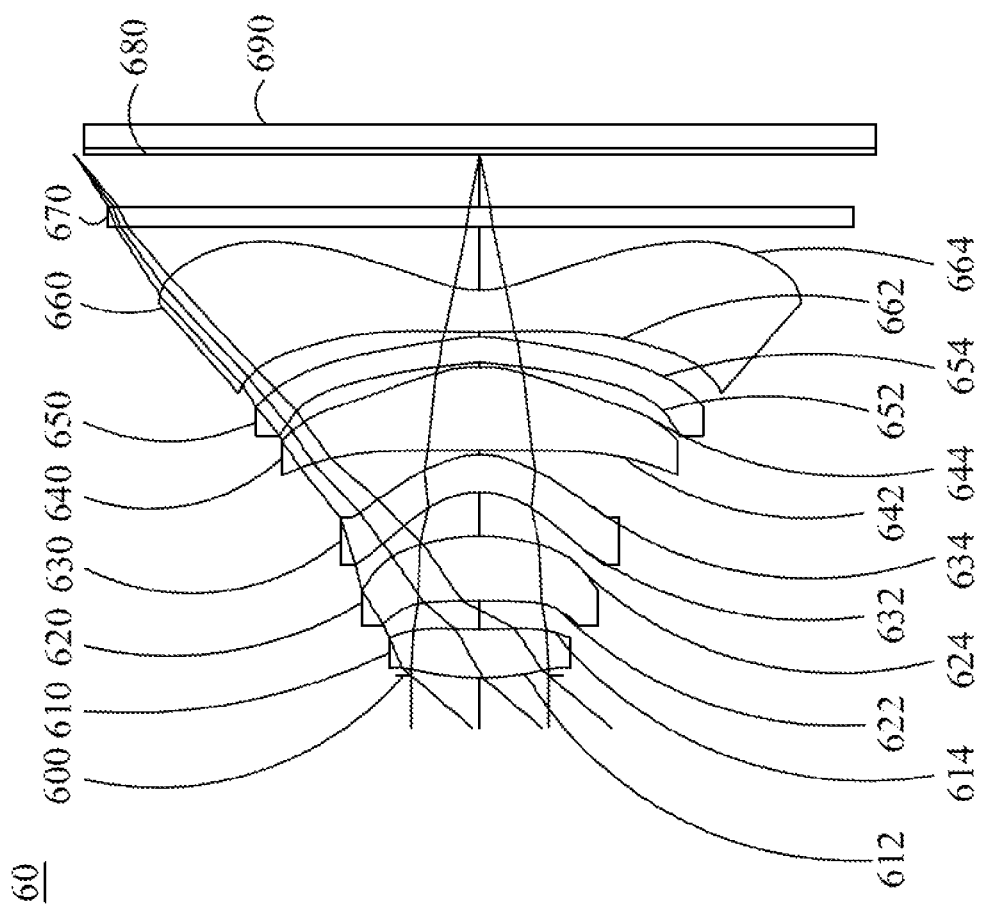
FIG. 6A is a schematic view of the optical image capturing system according to the sixth embodiment of the present application.
Figure 6B:
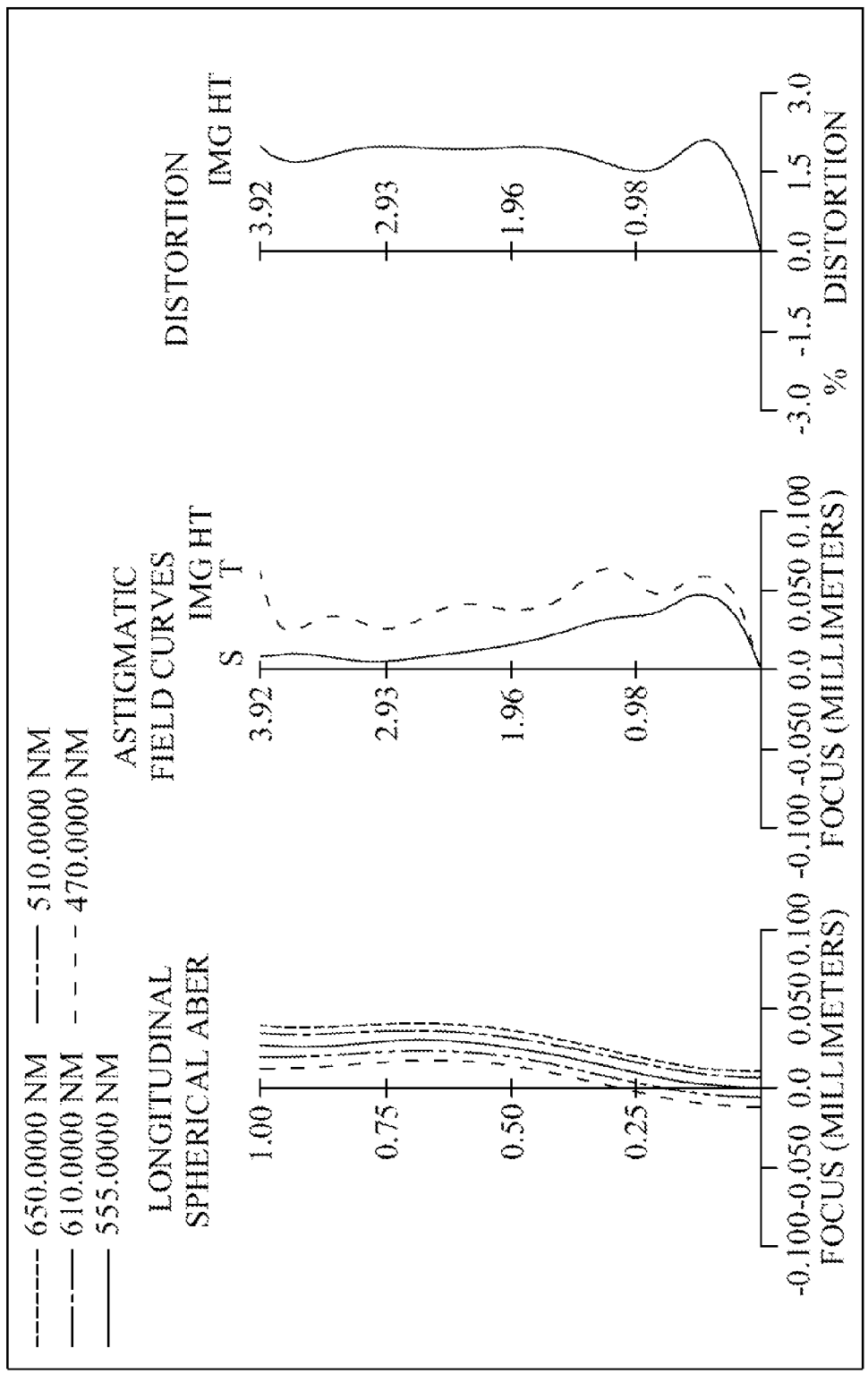
FIG. 6B is longitudinal spherical aberration curves, astigmatic field curves, and an optical distortion grid of the optical image capturing system in the order from left to right according to the sixth embodiment of the present application.
Figure 6C:
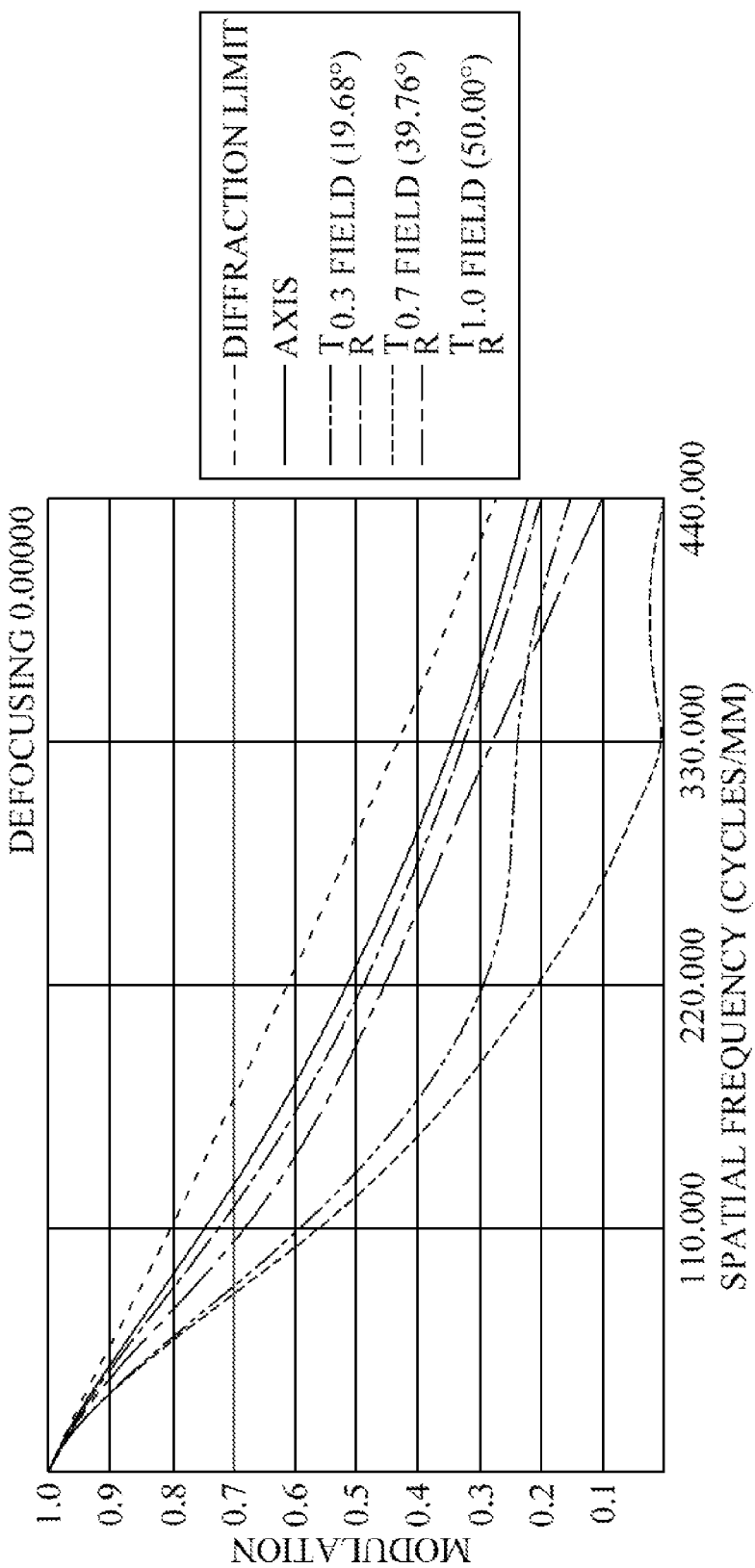
FIG. 6C is a characteristic diagram of modulation transfer according to the sixth embodiment of the present application.

Please refer to FIG. 6A. FIG. 6B and FIG. 6C, FIG. 6A is a schematic view of the optical image capturing system according to the sixth Embodiment of the present application, FIG. 6B is longitudinal spherical aberration curves, astigmatic field curves, and an optical distortion curve of the optical image capturing system in the order from left to right according to the sixth Embodiment of the present application, and FIG. 6C is a characteristic diagram of modulation transfer according to the sixth embodiment of the present application. As shown in FIG. 6A, in order from an object side to an image side, the optical image capturing system includes an aperture stop 600, a first lens element 610, a second lens element 620, a third lens element 630, a fourth lens element 640, a fifth lens element 650, a sixth lens element 660, an IR-bandstop filter 680, an image plane 690, and an image sensing device 692.

The first lens element 610 has positive refractive power and it is made of plastic material. The first lens element 610 has a convex object-side surface 612 and a concave image-side surface 614, both of the object-side surface 612 and the image-side surface 614 are aspheric, and the object-side surface 612 and the image-side surface 614 have an inflection point respectively.

The second lens element 620 has positive refractive power and it is made of plastic material. The second lens element 620 has a concave object-side surface 622 and a convex image-side surface 624, and both of the object-side surface 622 and the image-side surface 624 are aspheric.

The third lens element 630 has negative refractive power and it is made of plastic material. The third lens element 630 has a concave object-side surface 632 and a convex image-side surface 634, both of the object-side surface 632 and the image-side surface 634 are aspheric. The object-side surface 632 and the image-side surface 634 have an inflection point respectively.

The fourth lens element 640 has positive refractive power and it is made of plastic material. The fourth lens element 640 has a convex object-side surface 642 and a concave image-side surface 644, both of the object-side surface 642 and the image-side surface 644 are aspheric. The object-side surface 642 has an inflection point.

The fifth lens element 650 has positive refractive power and it is made of plastic material. The fifth lens element 650 has a concave object-side surface 652 and a convex image-side surface 654, both of the object-side surface 652 and the image-side surface 654 are aspheric.

The sixth lens element 660 has negative refractive power and it is made of plastic material. The sixth lens element 660 has a convex object-side surface 662 and a concave image-side surface 664. Hereby, the back focal length is reduced to miniaturize the lens element effectively. In addition, the object-side surface 662 and the image-side surface 664 have an inflection point respectively. Thus, the angle of incident with incoming light from an off-axis view field can be suppressed effectively and the aberration in the off-axis view field can be corrected further.

The IR-bandstop filter 680 is made of glass material without affecting the focal length of the optical image capturing system and it is disposed between the sixth lens element 660 and the image plane 690.

In the optical image capturing system of the sixth Embodiment, focal lengths of the second lens element 620 through the sixth lens element 660 are f2, f3, f4, f5 and f6 respectively. The following relations are satisfied: |f2|+|f3|+|f4|+|f5|=54.16093 mm. |f1|+|f6|=6.92385 mm and |f2|+|f3|+|f4|+|f5|>|f1|+|f6|.

In the optical image capturing system of the sixth Embodiment, focal lengths of the first lens element 610, the second lens element 620, the fourth lens element 640 and the fifth lens element 650 are f1, f2, f4 and f5, respectively. A sum of focal lengths of all lens elements with positive refractive power is ΣPP. The following relations are satisfied: ΣPP=f1+f2+f4+f5=24.38941 mm and f1/(f1+f2+f4+f5)= 0.21604. Hereby, it is favorable for allocating the positive refractive power of the first lens element 610 to other positive lens elements and the significant aberrations generated in the process of moving the incident light can be suppressed.

In the optical image capturing system of the sixth Embodiment, focal lengths of the third lens element 630 and the sixth lens element 660 are f3 and f6 respectively. A sum of focal lengths of all lens elements with negative refractive power is ΣNP. The following relations are satisfied: ΣNP=f3+f6=−36.69537 mm and f6/(f3+f6)=0.04509. Hereby, it is favorable for allocating the negative refractive power of the sixth lens element 660 to other negative lens elements.

In the optical image capturing system of the present embodiment, contrast transfer rates of modulation transfer with half frequencies (MTF values) at the optical axis on the image plane, 0.3 HOI and 0.7 HOI are respectively denoted by MTFH0, MTFH3 and MTFH7. The following relations are satisfied: MTFH0 is about 0.52, MTFH3 is about 0.3 and MTFH7 is about 0.2.

Please refer to the following Table 11 and Table 12.

The detailed data of the optical image capturing system of the sixth Embodiment is as shown in Table 11.

TABLE 11

Data of the optical image capturing system
f = 3.202 mm; f/HEP = 2.4; HAF = 50.001 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. Stop | Plano | −0.019 | | | | |
| 2 | Lens 1 | 2.718797781 | 0.468 | Plastic | 1.565 | 58.00 | 5.769 |
| 3 | | 28.45024666 | 0.271 | | | | |
| 4 | Lens 2 | −9.911435762 | 0.619 | Plastic | 1.565 | 58.00 | 6.388 |
| 5 | | −2.711744868 | 0.420 | | | | |
| 6 | Lens 3 | −0.8375783 | 0.359 | Plastic | 1.650 | 21.40 | −35.041 |
| 7 | | −1.016932481 | 0.050 | | | | |
| 8 | Lens 4 | 109.3059869 | 0.800 | Plastic | 1.565 | 58.00 | 2.309 |
| 9 | | −1.32093355 | 0.050 | | | | |
| 10 | Lens 5 | −1.639849287 | 0.237 | Plastic | 1.650 | 21.40 | 10.424 |
| 11 | | −1.398026532 | 0.050 | | | | |
| 12 | Lens 6 | 16.18641495 | 0.411 | Plastic | 1.607 | 26.60 | −1.655 |
| 13 | | 0.942617937 | 0.600 | | | | |
| 14 | IR-bandstop filter | Plano | 0.200 | | 1.517 | 64.13 | |
| 15 | | Plano | 0.496 | | | | |
| 16 | Image plane | Plano | | | | | |

Reference wavelength = 555 nm

As for the parameters of the aspheric surfaces of the sixth Embodiment, reference is made to Table 12.

TABLE 12

Aspheric Coefficients

| Surface # | 2 | 3 | 4 | 5 |
|---|---|---|---|---|
| k | 1.533574E+00 | 1.359259E+01 | 4.291813E+01 | −7.260579E+00 |
| A4 | −4.148899E−02 | −8.560123E−02 | −1.110779E−01 | −1.350026E−01 |
| A6 | −4.335960E−02 | −6.855367E−02 | −5.900091E−02 | −1.188942E−02 |
| A8 | 1.531088E−02 | −3.597970E−02 | −3.389850E−02 | −5.207262E−03 |
| A10 | −7.330333E−02 | −3.171853E−02 | −9.640980E−02 | −1.640700E−02 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |

| Surface # | 6 | 7 | 8 | 9 |
|---|---|---|---|---|
| k | −8.684821E−01 | −9.755421E−01 | 5.000000E+01 | −7.362394E+00 |
| A4 | 1.242346E−02 | 3.056477E−02 | −1.566155E−02 | −1.424094E−02 |
| A6 | 4.356517E−02 | −3.580102E−03 | −2.777111E−03 | 5.121533E−03 |
| A8 | 2.384762E−02 | 2.034290E−02 | −5.211884E−04 | 1.426417E−03 |
| A10 | −3.886855E−03 | 1.267833E−04 | 2.827890E−04 | −6.988744E−04 |
| A12 | 0.000000E+00 | 0.00000E+000 | 0.000000E+00 | 0.000000E+00 |
| A14 | 0.000000E+00 | 0.000000E+00 | 0.000000E+00 | 0.000000E+00 |

| Surface # | 10 | 11 | 12 | 13 |
|---|---|---|---|---|
| k | −3.044498E+01 | −2.984750E+01 | 1.707193E+01 | −6.884544E+00 |
| A4 | −8.378713E−03 | −4.374818E−03 | −4.699986E−02 | −2.020136E−02 |
| A6 | −1.180107E−03 | −1.375009E−03 | 7.665500E−03 | 1.746632E−03 |
| A8 | −9.278060E−04 | 1.237652E−04 | −5.550166E−04 | −4.435729E−05 |
| A10 | 1.847226E−04 | −3.498573E−05 | 2.669812E−05 | −4.755952E−06 |
| A12 | 4.432661E−05 | −1.562860E−05 | 4.009994E−06 | −1.840945E−07 |
| A14 | −3.177369E−05 | 2.048379E−06 | −2.554922E−06 | 5.893740E−09 |

In the sixth Embodiment, the presentation of the aspheric surface formula is similar to that in the first embodiment. Besides, the definitions of parameters in following tables are equal to those in the first embodiment, so the repetitious details will not be given here.

The following contents may be deduced from Table 11 and Table 12.

| Sixth embodiment (Primary reference wavelength: 555 nm) | | | | | |
|---|---|---|---|---|---|
| ETP1 | ETP2 | ETP3 | ETP4 | ETP5 | ETP6 |
| 0.379 | 0.569 | 0.411 | 0.671 | 0.232 | 0.560 |
| ETP1/TP1 | ETP2/TP2 | ETP3/TP3 | ETP4/TP4 | ETP5/TP5 | ETP6/TP6 |
| 0.809 | 0.919 | 1.143 | 0.838 | 0.980 | 1.363 |
| ETL | EBL | EIN | EIR | PIR | EIN/ETL |
| 4.960 | 1.142 | 3.818 | 0.446 | 0.600 | 0.770 |
| SETP/EIN | EIR/PIR | SETP | STP | SETP/STP | BL |
| 0.739 | 0.743 | 2.821 | 2.895 | 0.975 | 1.296 |
| ED12 | ED23 | ED34 | ED45 | ED56 | EBL/BL |
| 0.234 | 0.260 | 0.262 | 0.100 | 0.141 | 0.8812 |
| SED | SIN | SED/SIN | | | |
| 0.996 | 0.841 | 1.184 | | | |
| ED12/IN12 | ED23/IN23 | ED34/IN34 | ED45/IN45 | ED56/IN56 | |
| 0.864 | 0.618 | 5.230 | 1.997 | 2.821 | |
| $\lvert f/f1 \rvert$ | $\lvert f/f2 \rvert$ | $\lvert f/f3 \rvert$ | $\lvert f/f4 \rvert$ | $\lvert f/f5 \rvert$ | $\lvert f/f6 \rvert$ |
| 0.60768 | 0.50125 | 0.09138 | 1.38682 | 0.30718 | 1.93496 |
| ΣPPR | ΣNPR | ΣPPR/$\lvert$ΣNPR$\rvert$ | IN12/f | IN56/f | TP4/(IN34 + TP4 + IN45) |
| 2.80293 | 2.02633 | 1.38325 | 0.08469 | 0.01562 | 0.88891 |
| $\lvert$f1/f2$\rvert$ | $\lvert$f2/f3$\rvert$ | (TP1 + IN12)/TP2 | | (TP6 + IN56)/TP5 | |
| 0.82486 | 0.18230 | 1.19410 | | 1.94718 | |
| HOS | InTL | HOS/HOI | InS/HOS | $\lvert$ODT$\rvert$ % | $\lvert$TDT$\rvert$ % |
| 5.03208 | 3.73582 | 1.28599 | 0.99618 | 2.09712 | 0.31086 |
| HVT51 | HVT52 | HVT61 | HVT62 | HVT62/HOI | HVT62/HOS |
| 0 | 0 | 0.60343 | 2.04739 | 0.52323 | 0.40687 |
| TP2/TP3 | TP3/TP4 | InRS61 | InRS62 | $\lvert$InRS61$\rvert$/TP6 | $\lvert$InRS62$\rvert$/TP6 |
| 0.28235 | 3.54169 | −0.51803 | −0.04958 | 1.26054 | 0.12065 |

The following contents may be deduced from Table 11 and Table 12.

| Related inflection point values of sixth Embodiment (Primary reference wavelength: 555 nm) | | | | | | | |
|---|---|---|---|---|---|---|---|
| HIF111 | 0.611336 | HIF111/HOI | 0.15623 | SGI111 | 0.062791 | $\lvert$SGI111$\rvert$/($\lvert$SGI111$\rvert$ + TP1) | 0.11826 |
| HIF121 | 0.179194 | HIF121/HOI | 0.04579 | SGI121 | 0.000473837 | $\lvert$SGI121$\rvert$/($\lvert$SGI121$\rvert$ + TP1) | 0.00101 |
| HIF311 | 0.898611 | HIF311/HOI | 0.22965 | SGI311 | −0.46197 | $\lvert$SGI311$\rvert$/($\lvert$SGI311$\rvert$ + TP3) | 0.56249 |
| HIF321 | 0.936537 | HIF321/HOI | 0.23934 | SGI321 | −0.40031 | $\lvert$SGI321$\rvert$/($\lvert$SGI321$\rvert$ + TP3) | 0.52697 |
| HIF411 | 0.218319 | HIF411/HOI | 0.055793 | SGI411 | 0.000182155 | $\lvert$SGI411$\rvert$/($\lvert$SGI411$\rvert$ + TP4) | 0.000228 |
| HIF611 | 0.340981 | HIF611/HOI | 0.087141 | SGI611 | 0.002975 | $\lvert$SGI611$\rvert$/($\lvert$SGI611$\rvert$ + TP6) | 0.007188 |
| HIF621 | 0.722668 | HIF621/HOI | 0.184684 | SGI621 | 0.172794 | $\lvert$SGI621$\rvert$/($\lvert$SGI621$\rvert$ + TP6) | 0.296004 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to an image side, comprising:
 a first lens element with positive refractive power;
 a second lens element with positive refractive power;
 a third lens element with refractive power;
 a fourth lens element with refractive power;
 a fifth lens element with refractive power;
 a sixth lens element with refractive power; and
 an image plane;
 wherein the optical image capturing system consists of six lens elements with refractive power, at least two lens elements among the first through sixth lens elements respectively have at least one inflection point on at least one surface thereof, at least one of the first through sixth lens elements has positive refractive power, an object-side surface and an image-side surface of the sixth lens element are aspheric, a focal length of the optical image capturing system is f, an entrance pupil diameter of the optical image capturing system is HEP, a distance from an axial point on an object-side surface of the first lens element to an axial point on the image plane is HOS, thicknesses in parallel with an optical axis of the first through sixth lens elements at height ½ HEP respectively are ETP1, ETP2, ETP3, ETP4, ETP5 and ETP6, a sum of ETP1 to ETP6 described above is SETP, thicknesses of the first through sixth lens elements on the optical axis respectively are TP1, TP2, TP3, TP4, TP5 and TP6, a sum of TP1 to TP6 described above is STP, and the following relations are satisfied: 1.2≤f/HEP≤6.0, 0.5≤HOS/f≤3 and 0.5≤SETP/STP<1.3.

2. The optical image capturing system of claim 1, wherein a horizontal distance in parallel with the optical axis from a coordinate point on the object-side surface of the first lens element at height ½ HEP to the image plane is ETL, a horizontal distance in parallel with the optical axis from a coordinate point on the object-side surface of the first lens element at height ½ HEP to a coordinate point on the image-side surface of the sixth lens element at height ½ HEP is EIN, and the following relation is satisfied: 0.2≤EIN/ETL<1.

3. The optical image capturing system of claim 2, wherein the thicknesses in parallel with the optical axis of the first through sixth lens elements at height ½ HEP respectively are ETP1, ETP2, ETP3, ETP4, ETP5 and ETP6, the sum of ETP1 to ETP6 described above is SETP, and the following relation is satisfied: 0.3≤SETP/EIN<1.

4. The optical image capturing system of claim 1, wherein the optical image capturing system comprises a light filtration element, the light filtration element is located between the sixth lens element and the image plane, a distance in parallel with the optical axis from a coordinate point on the image-side surface of the sixth lens element at height ½ HEP to the light filtration element is EIR, a distance in parallel with the optical axis from an axial point on the image-side surface of the sixth lens element to the light filtration element is PIR, and the following relation is satisfied: 0.2≤EIR/PIR≤0.8.

5. The optical image capturing system of claim 1, wherein an object-side surface or an image-side surface of at least one of the six lens elements has at least two inflection points.

6. The optical image capturing system of claim 1, wherein the optical image capturing system has a maximum height of image capturing HOI perpendicular to the optical axis on the image plane, contrast transfer rates of modulation transfer with half frequencies (MTF values) at the optical axis on the image plane, 0.3 HOI and 0.7 HOI are respectively denoted by MTFH0, MTFH3 and MTFH7, and the following relations are satisfied: MTFH0≥0.3, MTFH3≥0.2 and MTFH7≥0.1.

7. The optical image capturing system of claim 1, wherein a half of maximum view angle of the optical image capturing system is HAF, and the following relation is satisfied: 0.4≤|tan(HAF)|≤3.0.

8. The optical image capturing system of claim 1, wherein a horizontal distance in parallel with the optical axis from a coordinate point on the image-side surface of the sixth lens element at height ½ HEP to the image plane is EBL, a horizontal distance in parallel with the optical axis from an axial point on the image-side surface of the sixth lens element to the image plane is BL, and the following relation is satisfied: 0.2≤EBL/BL<1.

9. The optical image capturing system of claim 5, further comprising an aperture stop, a distance from the aperture stop to the image plane on the optical axis is InS, an image sensing device is disposed on the image plane, a half of a diagonal of an effective detection field of the image sensing device is HOI, and the following relations are satisfied: 0.5≤InS/HOS≤1.1 and 0≤HIF/HOI≤0.9.

10. An optical image capturing system, from an object side to an image side, comprising:
a first lens element with positive refractive power;
a second lens element with positive refractive power;
a third lens element with refractive power;
a fourth lens element with refractive power;
a fifth lens element with refractive power;
a sixth lens element with negative refractive power; and
an image plane;
wherein the optical image capturing system consists of six lens elements with refractive power, at least two lens elements among the six lens elements respectively have at least one inflection point on at least one surface thereof, at least one of the second through fifth lens elements has positive refractive power, an object-side surface and an image-side surface of the sixth lens element are aspheric, focal lengths of the first through sixth lens elements are f1, f2, f3, f4, f5 and f6 respectively, a focal length of the optical image capturing system is f, an entrance pupil diameter of the optical image capturing system is HEP, a distance from an axial point on an object-side surface of the first lens element to an axial point on the image plane is HOS, a horizontal distance in parallel with the optical axis from a coordinate point on the object-side surface of the first lens element at height ½ HEP to the image plane is ETL, a horizontal distance in parallel with the optical axis from a coordinate point on the object-side surface of the first lens element at height ½ HEP to a coordinate point on the image-side surface of the sixth lens element at height ½ HEP is EIN, and the following relations are satisfied: 1.2≤f/HEP≤6.0, 0.5≤HOS/f≤3.0, and 0.2≤EIN/ETL<1.

11. The optical image capturing system of claim 10, wherein a horizontal distance in parallel with the optical axis from a coordinate point on the image-side surface of the fifth lens element at height ½ HEP to a coordinate point on the object-side surface of the sixth lens element at height ½ HEP is ED56, a distance from the fifth lens element to the sixth lens element on the optical axis is IN56, and the following relation is satisfied: 0<ED56/IN56≤10.

12. The optical image capturing system of claim 10, wherein a horizontal distance in parallel with the optical axis from a coordinate point on the image-side surface of the first lens element at height ½ HEP to a coordinate point on the object-side surface of the second lens element at height ½ HEP is ED12, a distance from the first lens element to the second lens element on the optical axis is IN12, and the following relation is satisfied: 0<ED12/IN12<1.

13. The optical image capturing system of claim 10, wherein a thickness in parallel with the optical axis of the second lens element at height ½ HEP is ETP2, a thickness of the second lens element on the optical axis is TP2, and the following relation is satisfied: 0<ETP2/TP2≤3.

14. The optical image capturing system of claim 10, wherein a thickness in parallel with the optical axis of the fifth lens element at height ½ HEP is ETP5, a thickness of the fifth lens element on the optical axis is TP5, and the following relation is satisfied: 0<ETP5/TP5<1.

15. The optical image capturing system of claim 10, wherein a thickness in parallel with the optical axis of the sixth lens element at height ½ HEP is ETP6, a thickness of the sixth lens element on the optical axis is TP6, and the following relation is satisfied: 0<ETP6/TP6≤5.

16. The optical image capturing system of claim 10, wherein a distance from the first lens element to the second lens element on the optical axis is IN12, and the following relation is satisfied: 0<IN12/f≤0.8.

17. The optical image capturing system of claim 10, wherein the optical image capturing system satisfies the following relation: 0 mm<HOS≤20 mm.

18. The optical image capturing system of claim 10, wherein a half of maximum view angle of the optical image capturing system is HAF, and the following relation is satisfied: 0.4≤|tan(HAF)|≤3.0.

19. The optical image capturing system of claim 10, wherein the optical image capturing system satisfies the following relations: 0.001≤|f/f1|≤1.5, 0.01≤|f/f2|≤3, 0.01≤|f/f3|≤3, 0.01≤|f/f4|≤5, 0.1≤|f/f5|≤5 and 0.1≤|f/f6|≤5.0.

20. An optical image capturing system, from an object side to an image side, comprising:
- a first lens element with positive refractive power;
- a second lens element with positive refractive power;
- a third lens element with refractive power;
- a fourth lens element with refractive power;
- a fifth lens element with positive refractive power and at least one surface among an object-side surface and an image-side surface of the fifth lens element having at least one inflection point;
- a sixth lens element with negative refractive power and at least one surface among an object-side surface and an image-side surface of the sixth lens element having at least one inflection point; and
- an image plane;
- wherein the optical image capturing system consists of six lens elements with refractive power, at least one of the first through sixth lens elements has at least one inflection point, a focal length of the optical image capturing system is f, an entrance pupil diameter of the optical image capturing system is HEP, a half of maximum view angle of the optical image capturing system is HAF, a distance from an axial point on an object-side surface of the first lens element to an axial point on the image plane is HOS, a horizontal distance in parallel with the optical axis from a coordinate point on the object-side surface of the first lens element at height ½ HEP to the image plane is ETL, a horizontal distance in parallel with the optical axis from a coordinate point on the object-side surface of the first lens element at height ½ HEP to a coordinate point on the image-side surface of the sixth lens element at height ½ HEP is EIN, and the following relations are satisfied: $1.2 \leq f/HEP \leq 3.0$, $0.5 \leq HOS/f \leq 2.5$, $0.4 \leq |tan(HAF)| \leq 3.0$ and $0.2 \leq EIN/ETL < 1$.

21. The optical image capturing system of claim 20, wherein a horizontal distance in parallel with the optical axis from a coordinate point on the image-side surface of the sixth lens element at height ½ HEP to the image plane is EBL, a horizontal distance in parallel with the optical axis from an axial point on the image-side surface of the sixth lens element to the image plane is BL, and the following relation is satisfied: $0.2 \leq EBL/BL < 1$.

22. The optical image capturing system of claim 21, wherein a horizontal distance in parallel with the optical axis from a coordinate point on the image-side surface of the fifth lens element at height ½ HEP to a coordinate point on the object-side surface of the sixth lens element at height ½ HEP is ED56, a distance from the fifth lens element to the sixth lens element on the optical axis is IN56, and the following relation is satisfied: $0 < ED56/IN56 \leq 10$.

23. The optical image capturing system of claim 20, wherein a distance from the fifth lens element to the sixth lens element on the optical axis is IN56, and the following relation is satisfied: $0 < IN56/f \leq 8$.

24. The optical image capturing system of claim 23, wherein the optical image capturing system satisfies the following relation: $0 \text{ mm} < HOS \leq 20 \text{ mm}$.

25. The optical image capturing system of claim 23, further comprising an aperture stop, an image sensing device and a driving module, the image sensing device is disposed on the image plane and with at least five millions pixels, a distance from the aperture stop to the image plane on the optical axis is InS, the driving module and the six lens elements may couple to each other and shifts are produced for the six lens elements, and the following relation is satisfied: $0.5 \leq InS/HOS \leq 1.1$.

* * * * *